(12) United States Patent
Lee et al.

(10) Patent No.: US 11,193,407 B2
(45) Date of Patent: Dec. 7, 2021

(54) EXHAUST GAS TREATMENT APPARATUS HAVING DIFFUSING MEANS

(71) Applicant: PANASIA CO., LTD, Busan (KR)

(72) Inventors: Soo-Tae Lee, Busan (KR); Su-Kyu Lee, Busan (KR); Yong-Sub Kim, Incheon (KR); Keun-Jae Yook, Gyeongsangnam-do (KR); Seong-Jae Chin, Busan (KR); Yong-ki Choi, Gyeongsangnam-do (KR)

(73) Assignee: Panasia Co., Ltd., Busan (KR)

( * ) Notice: Subject to any disclaimer, the term of this patent is extended or adjusted under 35 U.S.C. 154(b) by 83 days.

(21) Appl. No.: 16/612,275

(22) PCT Filed: May 10, 2018

(86) PCT No.: PCT/KR2018/005399
§ 371 (c)(1),
(2) Date: Nov. 8, 2019

(87) PCT Pub. No.: WO2018/208109
PCT Pub. Date: Nov. 15, 2018

(65) Prior Publication Data
US 2021/0148263 A1  May 20, 2021

(30) Foreign Application Priority Data

May 12, 2017 (KR) .................. 10-2017-0059585

(51) Int. Cl.
*F01N 3/04* (2006.01)
*F01N 13/00* (2010.01)

(52) U.S. Cl.
CPC ............. *F01N 3/04* (2013.01); *F01N 13/009* (2014.06)

(58) Field of Classification Search
CPC combination set(s) only.
See application file for complete search history.

(56) References Cited

U.S. PATENT DOCUMENTS

| | | | | |
|---|---|---|---|---|
| 5,941,069 A | * | 8/1999 | Heath | ..................... F02B 35/02 60/307 |
| 6,613,130 B2 | * | 9/2003 | Givargis | .............. B01D 50/006 55/315.2 |

(Continued)

FOREIGN PATENT DOCUMENTS

| | | |
|---|---|---|
| JP | 2016-200117 A | 12/2016 |
| KR | 10-2010-0061622 A | 6/2010 |

(Continued)

OTHER PUBLICATIONS

International Search Report dated Sep. 18, 2018, issued in PCT Application No. PCT/KR2018/005399, fled May 10, 2018.

(Continued)

*Primary Examiner* — Binh Q Tran
(74) *Attorney, Agent, or Firm* — Workman Nydegger

(57) ABSTRACT

According to an embodiment of the present disclosure, an exhaust gas treatment apparatus may include: a preprocessor configured to primarily remove harmful substances from exhaust gas produced by combustion; and a postprocessor configured to further remove harmful substances from preprocessed gas, which is the exhaust gas from which the harmful substances have been primarily removed by the preprocessor, wherein the postprocessor may include a postprocessor housing having a preprocessed gas inlet through which the preprocessed gas is introduced and a postprocessed gas outlet through which postprocessed gas from which harmful substances have been further removed by the postprocessor is discharged and forming a flow path of the preprocessed gas therein, and a diffuser disposed adjacent to the preprocessed gas inlet and configured to diffuse the preprocessed gas introduced through the preprocessed gas inlet.

15 Claims, 15 Drawing Sheets

(56) References Cited

U.S. PATENT DOCUMENTS

| | | | |
|---|---|---|---|
| 7,610,692 B2 * | 11/2009 | Carin | F26B 23/022 |
| | | | 34/388 |
| 7,871,587 B2 * | 1/2011 | Gu | B01F 5/0682 |
| | | | 423/210 |
| 9,272,241 B2 | 3/2016 | Konigsson | |
| 10,556,204 B2 * | 2/2020 | Richardson | B01F 3/04985 |
| 2013/0333363 A1 * | 12/2013 | Joshi | F01N 3/2066 |
| | | | 60/301 |
| 2014/0238916 A1 * | 8/2014 | Duesel, Jr. | C02F 1/10 |
| | | | 210/179 |
| 2016/0332113 A1 * | 11/2016 | Jenkins | B01D 53/502 |

FOREIGN PATENT DOCUMENTS

| | | |
|---|---|---|
| KR | 10-1431077 A | 8/2014 |
| KR | 10-2016-0049782 A | 5/2016 |
| KR | 10-1635935 A | 7/2016 |

OTHER PUBLICATIONS

Written Opinion dated Sep. 18, 2018, issued in PCT Application No. PCT/KR2018/005399, fled May 10, 2018.

\* cited by examiner

EXHAUST GAS TREATMENT APPARATUS HAVING DIFFUSING MEANS

BACKGROUND OF THE INVENTION

1. The Field of the Invention

The present disclosure relates to an exhaust gas treatment apparatus having a diffuser and, more particularly, to an exhaust gas treatment apparatus including a preprocessor that primarily removes harmful substances from exhaust gas produced by combustion and a postprocessor that further removes harmful substances from preprocessed gas, which is the exhaust gas from which harmful substances have been primarily removed by the preprocessor, wherein the postprocessor includes a diffuser for diffusing the preprocessed gas flowing thereinto.

2. The Relevant Technology

Most modern ships have engines and boilers to satisfy their own power and heating requirements. In order to drive the engine and the boiler, fuel must be burned, and exhaust gas generated during the combustion process contains harmful substances such as sulfur oxides (SOx), nitrogen oxides (NOx), particulate matter (PM), and the like.

Sulfur oxides or nitrogen oxides may act on the mucous membranes of the human body, thereby causing respiratory diseases, and are also pollutants designated as Class 1 carcinogens by the International Agency for Research on Cancer under the World Health Organization (WHO). In addition, if SOx or NOx is released untreated into the air, it reacts with moisture (H20) in the atmosphere to become sulfuric acid (H2SO4) and nitric acid (HNO3), respectively, which are major causes of acid rain.

PM is in the form of small particles, compared to gaseous pollutants. If PM in the exhaust gas is released into the air untreated, it may cause visibility problems of reducing the visible distance, or fine particles may enter the human body through the lungs or respiratory organs and cause various diseases. Fine dust, which has recently been a major issue in Korea, is also caused by PM, and PM may be regarded as a major cause of air pollution.

Therefore, it is necessary to prevent the emission of harmful substances in exhaust gas. In particular, in the case of ships having a huge engine capacity, it is known that an engine thereof emits 130 times as much exhaust gas as a passenger car. Thus, in order to prevent the emission of a huge amount of harmful matter, specific and practical measures for treating exhaust gas from a ship are required.

Accordingly, the International Maritime Organization (hereinafter, referred to as "IMO") has designated Emission Control Areas (hereinafter, referred to as "ECAs") to limit the emission of harmful substances in the corresponding areas. In particular, SOx Emission Control Areas (hereinafter, referred to as "SECAs") are more broadly regulated than ECAs, in which other harmful substances such as NOx are also regulated, meaning that tougher sanctions are applied.

Furthermore, as of Jan. 1, 2015, regulations were further tightened to limit the sulfur content of fuels that cause environmental pollution to 0.1% for all ships passing through SECAs (IMO 184(59)). SECAs were extended from the Baltic Sea and the North Sea to North America through an amendment to the Marine Pollution Prevention Convention in August 2011, and the coast of China was also designated as a SECA as of Apr. 1, 2016. Therefore, sulfur oxide management is expected to become more important in consideration of the extension of the SECAs as described above.

In addition, legislation to lower the SOx content of exhaust gas in oceans around the world, in addition to ECAs, from 3.5% to 0.5% was passed at the IMO General Assembly held on Oct. 28, 2016, and will come into effect in 2020. Thus, the need for sulfur oxide management is increasing, regardless of the region.

In order to comply with such international regulations, low-sulfur oil is used or LNG propulsion vessels, which use natural gas with low sulfur oxide emissions, are used. In addition, scrubbers for reducing sulfur oxides in the exhaust gas are used.

If exhaust gas is post-treated using a scrubber, it is possible to prevent environmental pollution even when using a low-cost fuel having relatively high sulfur content while satisfying the above regulations, and it is thus economical. As described above, scrubbers are widely used in both ships and power plants because they are able to satisfy both economic and environmental requirements.

U.S. Pat. No. 9,272,241 (registered on Mar. 1, 2016) titled "Combined cleaning system and method for reduction of SOx and NOx in exhaust gas from a combustion engine" discloses a scrubber for absorbing SOx and PM in the exhaust gas. The scrubber ionizes SOx with cleaning liquid. In this case, if seawater having a pH of about 8.3 is used as cleaning liquid, it is possible to neutralize the ionized sulfur oxides without adding separate alkaline additives. In addition, the particulate matter may be aggregated and discharged together with the cleaning liquid, thereby preventing release thereof into the air.

However, the disclosure represents only an outline of a circulation process of exhaust gas and cleaning liquid, including a scrubber, and does not provide a specific configuration inside the scrubber or specific cleaning methods.

The scrubber has a very long elongated shape in the vertical direction and occupies a big volume in the ship, so that it is inefficient in terms of space utilization and spoils the appearance of the ship. Therefore, there is a need for a method of reducing the height of the scrubber, but the above document does not disclose any solution to this problem.

Exhaust gas introduced into the scrubber must be evenly dispersed inside the processor in order to improve working efficiency using cleaning liquid. However, the prior document does not provide any configuration therefor.

In addition, although a method of mixing the cleaning liquid and the exhaust gas is regarded as one of important performance features of the scrubbers because effective mixing of the cleaning liquid and the exhaust gas is able to increase the contact time and contact area therebetween for a desired cleaning process, no specific method related to the same is disclosed in the above disclosure.

In addition, when the exhaust gas passes through the scrubber during the discharge process thereof, pressure loss of the exhaust gas occurs due to spraying of seawater for cleaning and obstruction by the structure therein. Although the pressure loss is important enough to quantify and use as an indicator to represent the performance of the scrubber, the document does not provide a method for preventing such pressure loss.

In some cases, there is a problem in which the cleaning liquid, such as seawater, sprayed inside a scrubber flows backwards to the bottom thereof and flows into an engine and a boiler from which the exhaust gas is emitted. However, the patent document does not include any measure for this.

Although the amount of exhaust gas discharged according to the load of the engine or boiler is variable, the patent disclosure simply sprays cleaning liquid without consideration of the change of flow, thereby lowering work efficiency.

A filter, such as a demister (e.g., a gas/liquid separator), for removing fine cleaning liquid particles from the exhaust gas may become clogged if it is used for a long period of time. Thus, a method for cleaning the demister is also required.

Finally, it is also necessary to prevent the cleaning liquid absorbing harmful substances in the exhaust gas from being discharged together with the exhaust gas into the air.

Therefore, there is a demand for an exhaust gas treatment apparatus capable of evenly dispersing the exhaust gas while minimizing pressure loss of exhaust gas, effectively removing harmful substances by appropriately mixing sulfur oxides and PM with cleaning liquid to discharge only clean gas, improving space utilization by reducing the volume of the scrubber, improving work efficiency by adaptively operating according to the engine load, and preventing backflow of the cleaning liquid to the engine.

SUMMARY OF THE INVENTION

The present disclosure has been made in order to solve the problems with the prior art described above, and an aspect of the present disclosure is to provide an exhaust gas treatment apparatus including a preprocessor that primarily removes harmful substances from exhaust gas produced by combustion and a postprocessor that further removes harmful substances from preprocessed gas, which is the exhaust gas from which harmful substances have been primarily removed by the preprocessor, wherein the postprocessor includes a diffuser for diffusing the preprocessed gas flowing thereinto.

Another aspect of the present disclosure is to provide an exhaust gas treatment apparatus having a diffuser, which is capable of efficiently diffusing preprocessed gas in the lower portion of a postprocessor by a diffuser arranged to be spaced apart from the front of a preprocessed gas inlet through which the preprocessed gas flows into the postprocessor.

Yet another aspect of the present disclosure is to provide an exhaust gas treatment apparatus having a diffuser that is arranged to cover the front of the preprocessed gas inlet and is capable of efficiently diffusing preprocessed gas by means of a body including a diffusion part through which the preprocessed gas passes.

Still yet another aspect of the present disclosure is to provide an exhaust gas treatment apparatus having a diffuser that includes a body in a shape capable of efficiently diffusing the preprocessed gas.

Still yet another aspect of the present disclosure is to provide an exhaust gas treatment apparatus having a diffuser, which is capable of efficiently diffusing the preprocessed gas using two or more diffusers arranged in sequence in front of a preprocessed gas inlet through which the preprocessed gas flows into the postprocessor.

Still yet another aspect of the present disclosure is to provide an exhaust gas treatment apparatus having a diffuser capable of improving space utilization and the efficiency of removal of harmful substances by double-spraying cleaning liquid to a flow path of the exhaust gas flowing inside a preprocessor that primarily removes harmful substances from the exhaust gas produced by combustion.

Still yet another aspect of the present disclosure is to provide an exhaust gas treatment apparatus having a diffuser, which is capable of improving space utilization and the efficiency of removal of harmful substances by forming the flow of the exhaust gas, which flows inside a preprocessor that primarily removes harmful substances from the exhaust gas produced by combustion, into a curved pattern by an agitator.

Still yet another aspect of the present disclosure is to provide an exhaust gas treatment apparatus having a diffuser, which is applied to a ship and is capable of effectively removing harmful substances including sulfur oxides (SOx) from the exhaust gas discharged from an engine, a boiler, or the like of the ship.

The present disclosure may be implemented as embodiments having the following configuration in order to achieve the above aspects.

According to an embodiment of the present disclosure, an exhaust gas treatment apparatus may include: a preprocessor configured to primarily remove harmful substances from exhaust gas produced by combustion; and a postprocessor configured to further remove harmful substances from preprocessed gas, which is the exhaust gas from which harmful substances have been primarily removed by the preprocessor, wherein the postprocessor may include: a postprocessor housing having a preprocessed gas inlet through which the preprocessed gas is introduced and a postprocessed gas outlet through which postprocessed gas from which harmful substances have been further removed by the postprocessor is discharged and forming a flow path of the preprocessed gas therein; and a diffuser disposed adjacent to the preprocessed gas inlet and configured to diffuse the preprocessed gas introduced through the preprocessed gas inlet.

According to another embodiment of the present disclosure, the diffuser may be disposed in front of the preprocessed gas inlet so as to be spaced apart therefrom in the postprocessor housing, and may be configured to diffuse the preprocessed gas to the inside of the postprocessor housing.

According to another embodiment of the present disclosure, the diffuser may be disposed to cover the front of the preprocessed gas inlet, and may include a body having a diffusion part through which the preprocessed gas passes.

According to another embodiment of the present disclosure, the diffusion part may include a plurality of through-holes.

According to another embodiment of the present disclosure, the body may be formed so as to vertically cover the front of the preprocessed gas inlet, and upper and lower ends thereof may be inclined or curved upwards and downwards, respectively, toward the preprocessed gas inlet.

According to another embodiment of the present disclosure, two or more diffusers may be arranged in sequence in front of the preprocessed gas inlet.

According to another embodiment of the present disclosure, the preprocessor may include: a preprocessor housing having an exhaust gas inlet through which the exhaust gas is introduced and a preprocessed gas outlet through which the preprocessed gas, which is the exhaust gas from which the harmful substances have been primarily removed by the preprocessor, is discharged and forming a flow path of the exhaust gas therein; and an agitator configured to cause the exhaust gas in the flow path to flow in a curved pattern.

According to another embodiment of the present disclosure, the agitator may be arranged to cover the flow path inside the preprocessor housing, and may include a body in the center thereof and blades radially coupled to the body at a predetermined torsion angle.

According to another embodiment of the present disclosure, the agitator may have space portions formed between the blades, through which the exhaust gas passes without colliding with the blades.

According to another embodiment of the present disclosure, the agitator may be fixed so as to be prevented from rotating.

According to another embodiment of the present disclosure, the preprocessor may further include: a first preprocessor sprayer disposed between the exhaust gas inlet and the agitator and configured to spray cleaning liquid to the exhaust gas introduced through the exhaust gas inlet; and a second preprocessor sprayer disposed between the agitator and the preprocessed gas outlet and configured to spray cleaning liquid to the exhaust gas that flows in a spiral pattern by passing through the agitator in the flow path.

According to another embodiment of the present disclosure, the first preprocessor sprayer may spray the cleaning liquid in the form of microdroplets, compared to the second preprocessor sprayer.

According to another embodiment of the present disclosure, the first preprocessor sprayer may spray the cleaning liquid in the form of droplets having a particle diameter of 100 to 200 µm.

According to another embodiment of the present disclosure, the second preprocessor sprayer may spray the cleaning liquid in the form of droplets having a particle diameter of 500 to 1,000 µm.

According to another embodiment of the present disclosure, the exhaust gas treatment apparatus having the diffuser of the present disclosure may be installed in a ship, and the harmful substances may include sulfur oxides (SOx).

The present disclosure has the following effects through the above-described configuration.

The present disclosure has an effect of providing an exhaust gas treatment apparatus including a preprocessor that primarily removes harmful substances from exhaust gas produced by combustion and a postprocessor that further removes harmful substances from preprocessed gas, which is the exhaust gas from which harmful substances have been primarily removed by the preprocessor, wherein the postprocessor includes a diffuser for diffusing the preprocessed gas flowing thereinto.

The present disclosure has an effect of providing an exhaust gas treatment apparatus having a diffuser, which is capable of efficiently diffusing preprocessed gas in the lower portion of a postprocessor by a diffuser arranged to be spaced apart from the front of a preprocessed gas inlet through which the preprocessed gas flows into the postprocessor.

The present disclosure has an effect of providing an exhaust gas treatment apparatus having a diffuser that is arranged to cover the front of the preprocessed gas inlet and is capable of efficiently diffusing preprocessed gas by means of a body including a diffusion part through which the preprocessed gas passes.

The present disclosure has an effect of providing an exhaust gas treatment apparatus having a diffuser that includes a body in a shape capable of efficiently diffusing the preprocessed gas.

The present disclosure has an effect of providing an exhaust gas treatment apparatus having a diffuser, which is capable of efficiently diffusing the preprocessed gas using two or more diffusers arranged in sequence in front of a preprocessed gas inlet through which the preprocessed gas flows into the postprocessor.

The present disclosure has an effect of providing an exhaust gas treatment apparatus having a diffuser capable of improving space utilization and the efficiency of removal of harmful substances by double-spraying cleaning liquid to a flow path of the exhaust gas flowing inside a preprocessor that primarily removes harmful substances from the exhaust gas produced by combustion.

The present disclosure has an effect of providing an exhaust gas treatment apparatus having a diffuser, which is capable of improving space utilization and the efficiency of removal of harmful substances by forming a flow of the exhaust gas, which flows inside a preprocessor that primarily removes harmful substances from the exhaust gas produced by combustion, into a curved pattern by an agitator.

The present disclosure has an effect of providing an exhaust gas treatment apparatus having a diffuser, which is applied to a ship and is capable of effectively removing harmful substances including sulfur oxides (SOx) from the exhaust gas discharged from an engine, a boiler, or the like of the ship.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE PREFERRED EMBODIMENTS

Hereinafter, an exhaust gas treatment apparatus having a diffuser according to the present disclosure will be described in detail with reference to the accompanying drawings. Unless otherwise defined, all definitions of terms in this specification are equivalent to the general meanings of the terms understood by those of ordinary skill in the art to which the present disclosure pertains, and if the terms conflict with the meanings of the terms used herein, they should be interpreted according to the definition used in the present specification. In addition, a detailed description of well-known functions and configurations that may unnecessarily obscure the subject matter of the present disclosure will be omitted.

In the present disclosure, "exhaust gas" refers to gas generated in the process of burning fuel to drive a combustion device such as an engine, a boiler, or the like, and the harmful substances in the exhaust gas are sulfur oxides (SOx), nitrogen oxides (NOx), particulate matter (PM), and the like, which are contained in the exhaust gas. An exhaust gas treatment apparatus having a diffuser according to the present disclosure is primarily intended to process the exhaust gas in a ship, but the application of the disclosure is not limited to ships.

Figure 1:
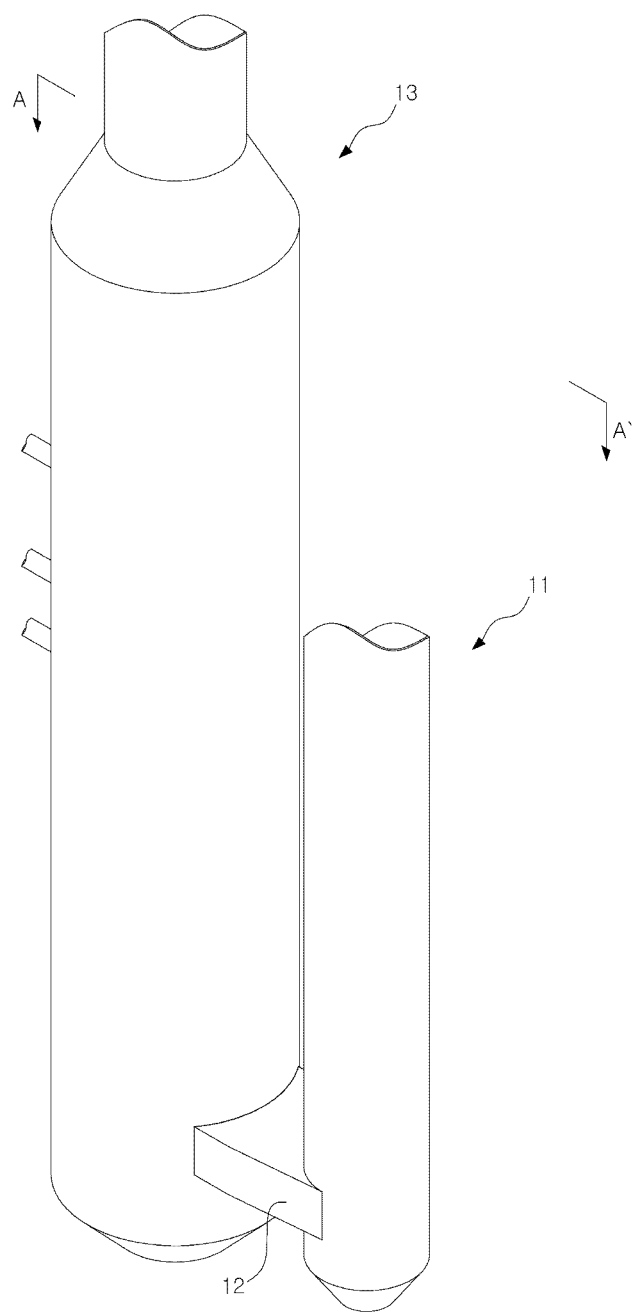
FIG. 1 is a perspective view of an exhaust gas treatment apparatus having a diffuser according to an embodiment of the present disclosure.
Figure 2:
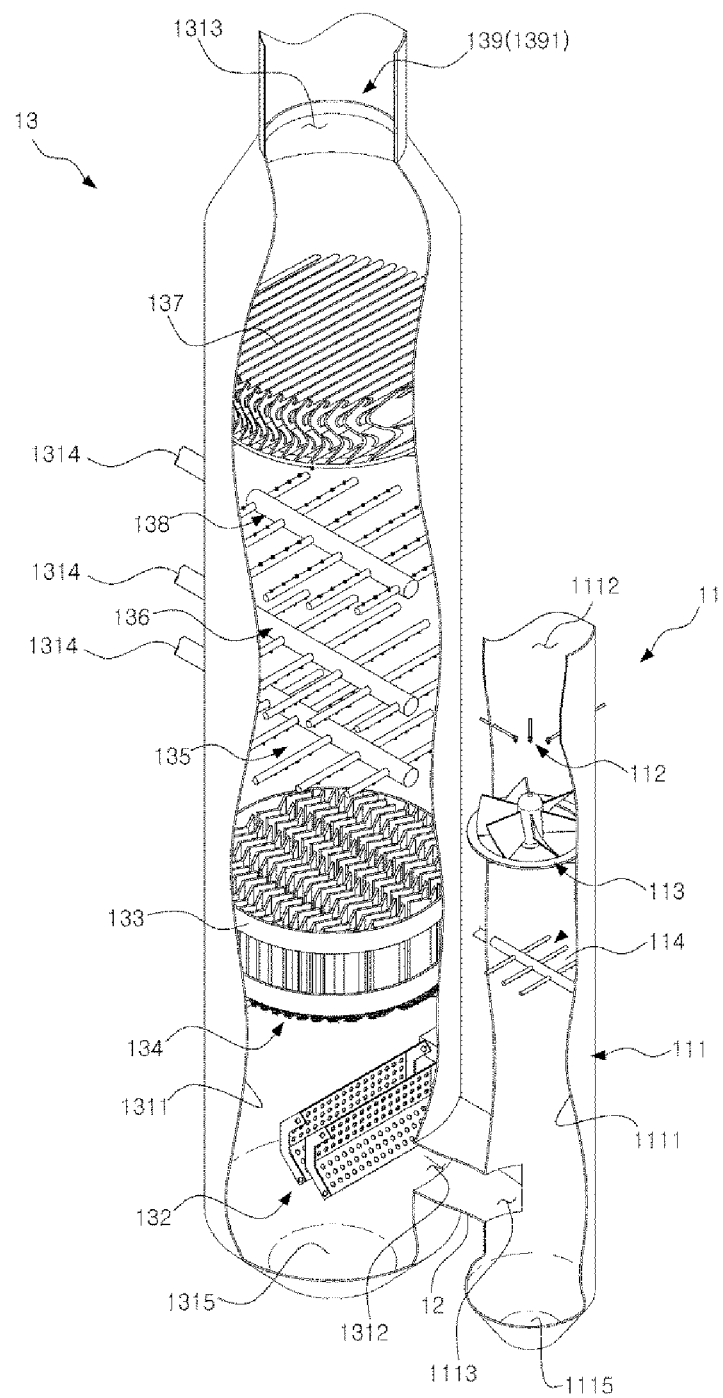
FIG. 2 is a cutaway perspective view of an exhaust gas treatment apparatus having a diffuser according to an embodiment of the present disclosure.
Figure 3:
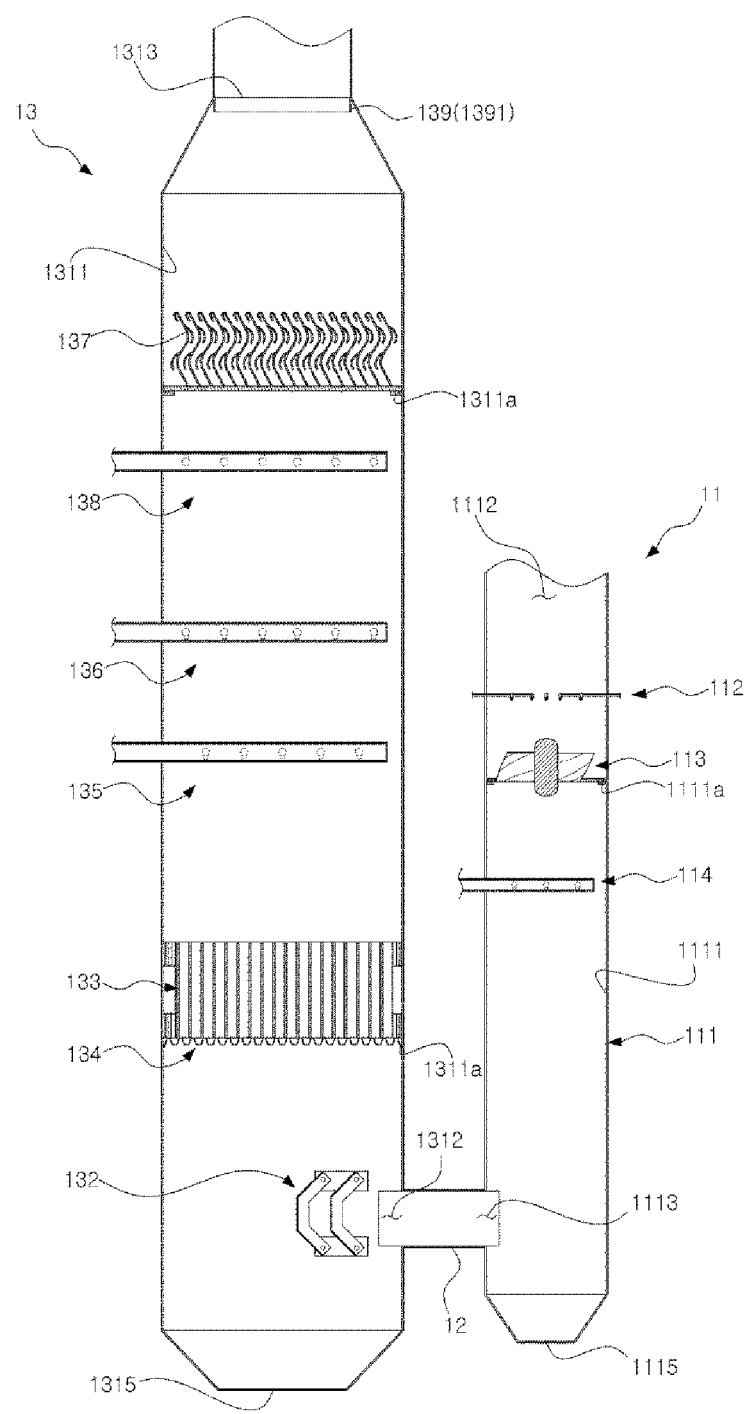
FIG. 3 is a cross-sectional view taken along the line A-A' in FIG. 1.

Referring to FIGS. 1 to 3, the exhaust gas treatment apparatus having a diffuser according to an embodiment of the present disclosure includes a preprocessor 11, a connection part 12, and a postprocessor 13.

Figure 4:
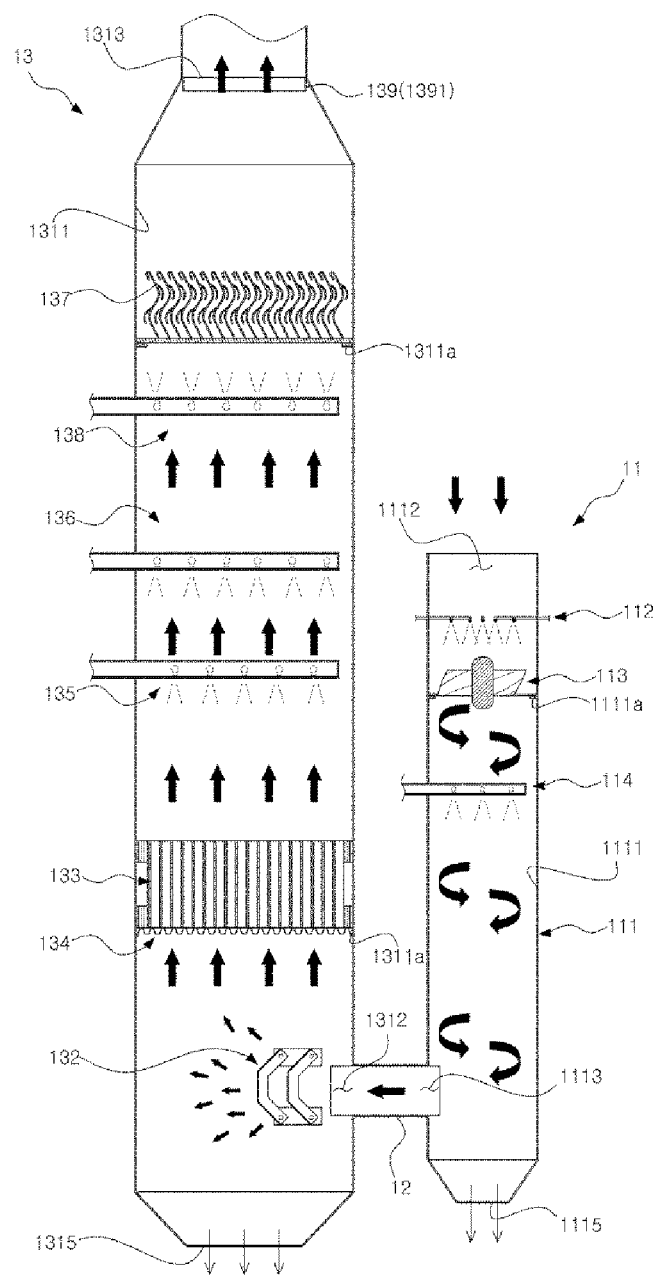
FIG. 4 is a reference diagram illustrating a process of processing an exhaust gas in the cross-section view in FIG. 3.

The procedure of processing the exhaust gas performed by the exhaust gas treatment apparatus will be briefly described with reference to FIG. 4. In FIG. 4, the thick arrow indicates the flow of gas, the dotted line indicates the cleaning liquid to be sprayed, and the thin arrow indicates the cleaning liquid to be discharged.

When exhaust gas produced by combustion is introduced through an exhaust gas inlet 1112, the preprocessor 11 processes the exhaust gas into preprocessed gas from which the harmful substances are primarily removed and discharges the same through a preprocessed gas outlet 1113. The connection part 12 moves the preprocessed gas to the postprocessor 13. The postprocessor 13 further removes harmful substances from the preprocessed gas introduced through a preprocessed gas inlet 1312 and discharges the same through a postprocessed gas outlet 1313.

The cleaning liquid introduced through a cleaning liquid inlet 1114 of the preprocessor 11 and used in the removal of harmful substances from the exhaust gas in the preprocessor 11 and the cleaning liquid introduced through a cleaning liquid inlet 1314 of the postprocessor 13 and used in the removal of harmful substances from the preprocessed gas in the postprocessor 13 are discharged through cleaning liquid outlets 1115 and 1315, respectively, which are formed in the bottoms of the preprocessor 11 and the postprocessor 13.

In the case where the present disclosure is applied to a ship, seawater or fresh water mixed with alkaline additives may be used as the cleaning liquid, and the exhaust gas may be produced during combustion in an engine or a boiler of the ship. In addition, the harmful substances may be sulfur oxides (SOx) and PM.

The preprocessor 11 serves to primarily remove harmful substances from the exhaust gas produced by combustion. As can be seen in FIGS. 2 to 5, the preprocessor 11 includes a preprocessor housing 111, a first preprocessor sprayer 112, an agitator 113, and a second preprocessor sprayer 114.

The preprocessor housing 111 forms the external shape of the preprocessor 11 and forms a flow path of the exhaust gas therein. The preprocessor housing 111 includes an inner wall 1111, an exhaust gas inlet 1112, a preprocessed gas outlet 1113, a cleaning liquid inlet 1114, and a cleaning liquid outlet 1115. Referring to FIGS. 1 to 5, in an embodiment of the present disclosure, the preprocessor housing 111 is formed as a cylindrical tower and provides a flow path through which the introduced exhaust gas flows from the top of the preprocessor housing 111 to the bottom thereof, thereby primarily removing harmful substances from the exhaust gas.

The inner wall 1111 is a portion that forms a flow path of the exhaust gas inside the preprocessor housing 111. Referring to FIG. 2, in an embodiment of the present disclosure, the inner wall 1111 forms a cylindrical flow path of the exhaust gas inside the preprocessor housing 111.

The exhaust gas is introduced into the preprocessor housing 111 through the exhaust gas inlet 1112. As can be seen in FIGS. 2 to 5, the exhaust gas inlet 1112 is formed at an upper end of the preprocessor housing 111, and the exhaust gas introduced through the exhaust gas inlet 1112 flows down along the cylindrical flow path formed by the inner wall 1111.

The preprocessed gas, which is the exhaust gas from which harmful substances have primarily been removed in the preprocessor 11, is discharged through the preprocessed gas outlet 1113. As shown in FIGS. 2 to 5, the preprocessed gas outlet 1113 is formed at one lower side of the preprocessor housing 111, and the preprocessed gas discharged through the preprocessed gas outlet 1113 flows to the postprocessor 13 through the connection part 12.

Figure 5:
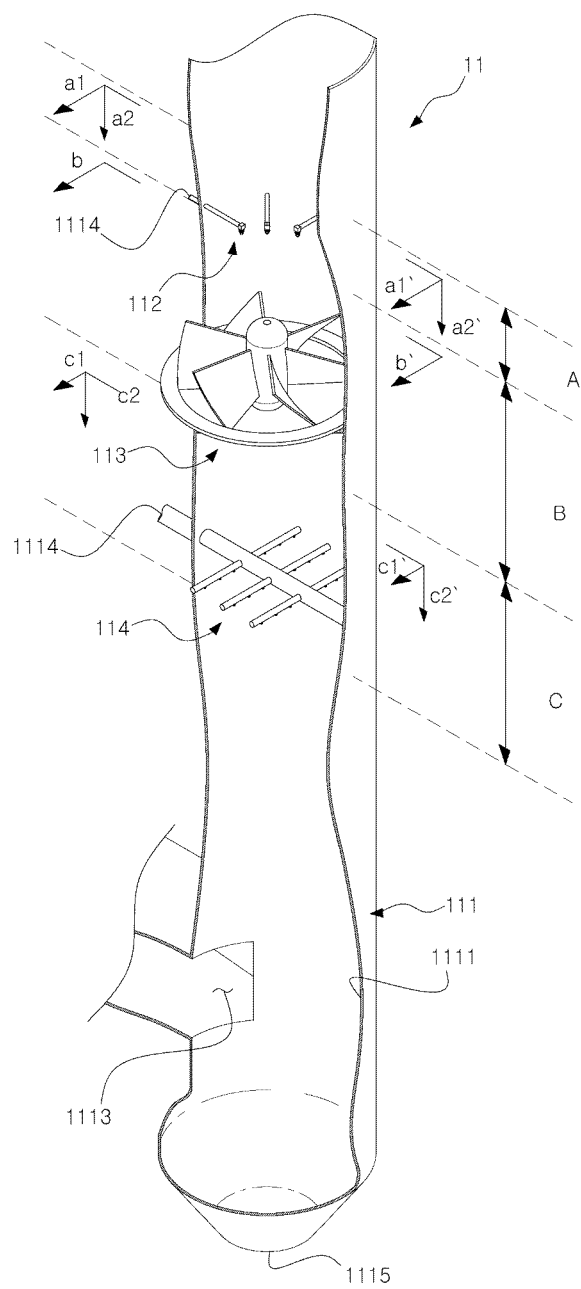
FIG. 5 is a cutaway perspective view of a preprocessor.

The cleaning liquid to be sprayed in the preprocessor 11 is introduced through the cleaning liquid inlet 1114. As shown in FIG. 5, the cleaning liquid inlet 1114 is connected to the first preprocessor sprayer 112 and the second preprocessor sprayer 114, respectively, or is formed therein, which will be described later.

The cleaning liquid sprayed by first preprocessor sprayer 112 and the second preprocessor sprayer 114 in order to remove harmful substances from the exhaust gas introduced into the preprocessor housing 111 through the exhaust gas inlet 1112, is discharged through the cleaning liquid outlet 1115. As shown in FIGS. 2 to 5, the cleaning liquid outlet 1114 is formed in the lower end of the preprocessor housing 111, and the cleaning liquid sprayed by the first preprocessor sprayer 112 and the second preprocessor sprayer 114 may capture harmful substances in the exhaust gas, and may move to the lower end of the preprocessor housing 111 to then be discharged to the outside through the cleaning liquid outlet 1114. The lower end of the preprocessor housing 111 may be preferably formed in a shape that converges toward the cleaning liquid outlet 1114 in order to facilitate the discharge of the cleaning liquid.

The first preprocessor sprayer 112 is disposed near the exhaust gas inlet 1112 inside the preprocessor housing 111 and sprays cleaning liquid to the exhaust gas introduced through the exhaust gas inlet 1112. As described above, seawater, fresh water mixed with alkaline additives, or the like may be used as the cleaning liquid.

The first preprocessor sprayer 112 cools the exhaust gas introduced through the exhaust gas inlet 1112. The exhaust gas introduced through the exhaust gas inlet 1112 generally has a temperature of 250 degrees C. to 350 degrees C., and the temperature thereof may be lowered to 50 degrees C. to 60 degrees C. by the cleaning liquid sprayed from the first preprocessor sprayer 112, and the volume thereof may be reduced.

In addition, the first preprocessor sprayer 112 allows, in particular, PM, among the harmful substances in the exhaust gas, to be primarily captured by the cleaning liquid. The exhaust gas in contact with the cleaning liquid sprayed by the first preprocessor sprayer 112 changes its flow path from a straight pattern to a spiral pattern while passing through the agitator 113, and comes into contact with the cleaning liquid sprayed by the second preprocessor sprayer 114, which will be described later. Accordingly, the cleaning liquid, which is sprayed by the first preprocessor sprayer 112 and captures the harmful substances, is increased in size and is moved to the lower portion of the preprocessor housing 111 due to gravity.

Preferably, the first preprocessor sprayer 112 sprays the cleaning liquid in the form of microdroplets, unlike the second preprocessor sprayer 114. Specifically, the first preprocessor sprayer 112 may spray the cleaning liquid in the form of droplets having a particle diameter of 100 to 200 μm. Among the harmful substances in the exhaust gas, PM has a particle diameter of 0.1 to 0.5 μm, and if the cleaning liquid is sprayed in the form of droplets having a particle diameter of 100 to 200 μm, the cleaning liquid can effectively capture and aggregate the PM.

Figure 6:
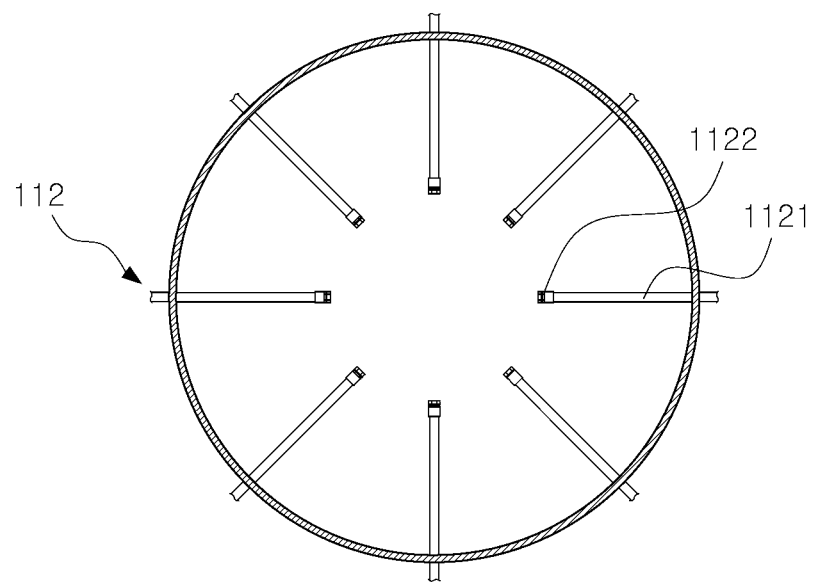
FIG. 6 is a cross-sectional view taken along the line a1-a1' in the section A in FIG. 5.
Figure 7:
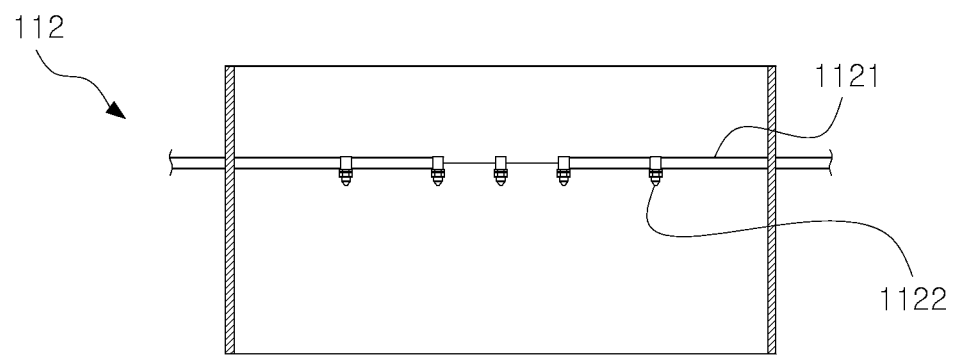
FIG. 7 is a cross-sectional view taken along the line a2-a2' in the section A in FIG. 5.

Referring to FIGS. 6 and 7, in an embodiment of the present disclosure, the first preprocessor sprayer 112 includes a rod-type spray body 1121 and a spray nozzle 1122 formed at one end of the spray body 1121. The spray body 1121 may be supplied with cleaning liquid and compressed air from a cleaning liquid supply means (not shown) through the cleaning liquid inlet 1114. The spray body 1121 receives cleaning liquid together with compressed air and delivers the same to the spray nozzle 1122, and the spray nozzle 1122 sprays the cleaning liquid to the exhaust gas.

Meanwhile, a plurality of first preprocessor sprayers 112 is disposed parallel to the cross section perpendicular to the flow direction of the exhaust gas in the flow path of the exhaust gas, which is formed by the inner wall 1111 of the preprocessor housing 111. The plurality of first preprocessor sprayers 112 is arranged so as to protrude from the inner wall 1111 toward the center of the flow path at a predetermined angular interval relative to each other. The above arrangement enables the cleaning liquid to be efficiently sprayed to the exhaust gas introduced through the exhaust gas inlet 1112 and flowing to the agitator 113.

The specific shape and arrangement of the first preprocessor sprayer 112 may vary depending on the spray capacity of the first preprocessor sprayer 112 and the overall designed length of the preprocessor 11.

The agitator 113 is disposed between the first preprocessor sprayer 112 and the second preprocessor sprayer 114 in the preprocessor housing 111 and serves to allow the exhaust gas to flow in a curve, preferably in a spiral, in the flow path thereof. In an embodiment of the present disclosure, the preprocessor housing 111 forms a flow path of the exhaust gas in the vertical direction from the top to the bottom, and the agitator 113 changes the flow of the exhaust gas, which is introduced through the exhaust gas inlet 1112 and flows straight down, into a curved pattern, preferably a spiral pattern.

When the flow path of the exhaust gas is changed from a straight pattern to a curved pattern by the agitator 113, the flow path becomes longer, and as a result thereof, the contact time between the exhaust gas and the cleaning liquid sprayed from the second preprocessor sprayer 114 may be increased. Accordingly, the proportion of harmful substances, such as PM, SOx, and the like, in the exhaust gas captured by the cleaning liquid is increased. Therefore, the agitator 113 is preferably disposed adjacent to the exhaust gas inlet 1112.

As described above, it is possible to increase the time during which harmful substances are removed from the exhaust gas relative to the internal space of the preprocessor housing 111 using the agitator 113, and it is possible to improve the efficiency of removal of harmful substances from the exhaust gas without increasing the height of the preprocessor 11, even if the height thereof is reduced. As a result, the equipment can be miniaturized.

Figure 8:
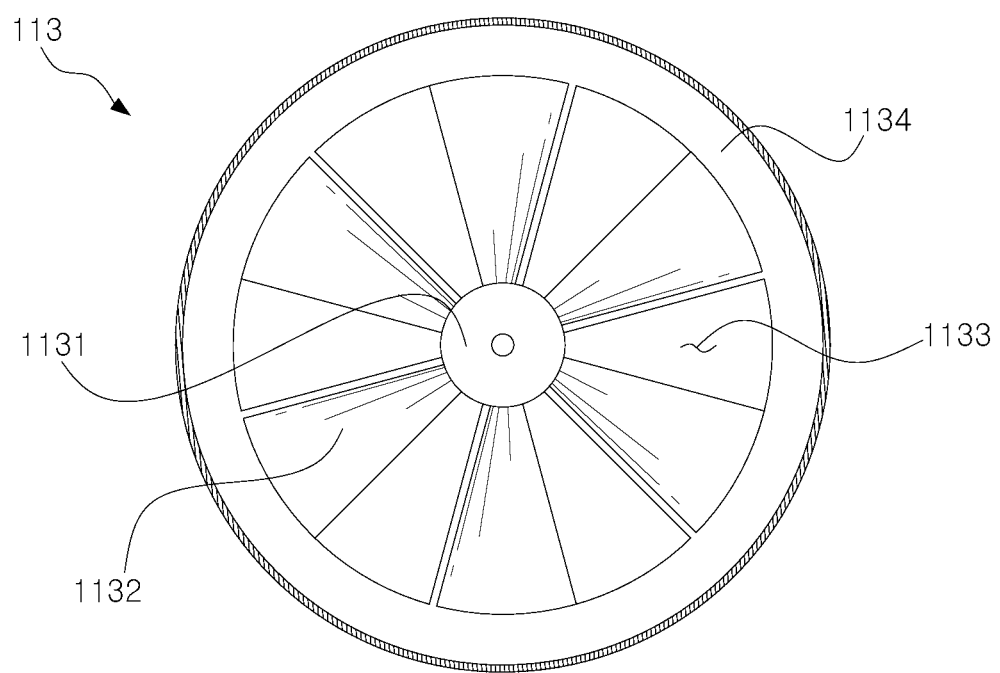
FIG. 8 is a cross-sectional view taken along the line b-b' in the section B in FIG. 5.
Figure 9:
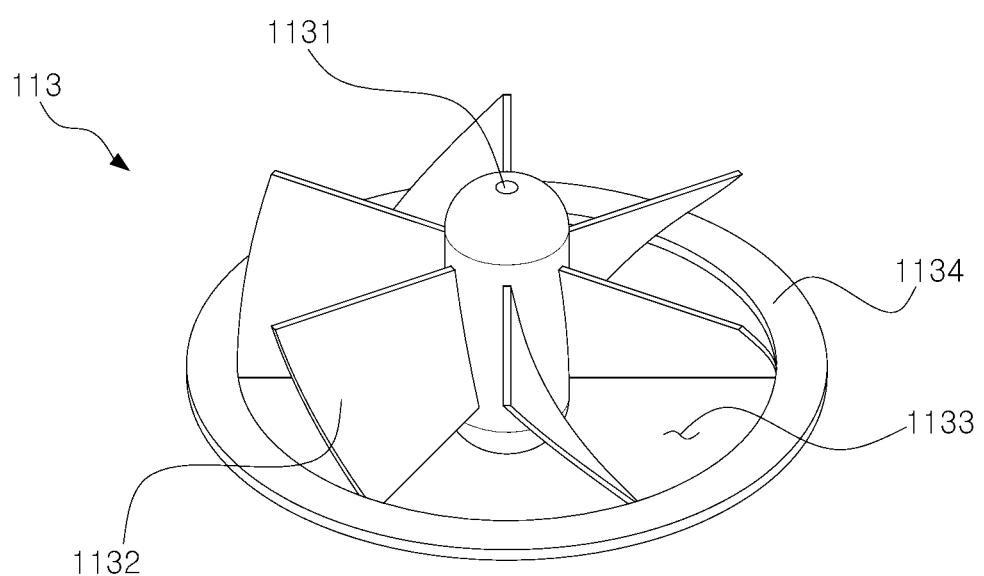
FIG. 9 is a perspective view of an agitator.

Referring to FIGS. 8 and 9, the agitator 113 is disposed so as to cover the flow path and includes a central body 1131, a plurality of blades 1132, and space portions 1133. The agitator 113 is placed on protrusion supports 1111a formed on the inner wall 1111 of the preprocessor housing 111 by means of a flange 1134 coupled to the outer side of the blades 1132. The agitator 113 may be arranged to be coupled to the inner wall 1111 of the preprocessor housing 111 by welding or the like, as necessary.

The body 1131 is the center of the agitator 113, and the blades 1132 are radially coupled to the body 1131 at a predetermined torsion angle. In addition, the exhaust gas may pass through the space portions 1133 between the blades 1132 without colliding therewith.

As shown in FIG. 8, in an embodiment of the present disclosure, the agitator 113 has six blades 1132 coupled to the body 1131 at angular intervals of 30 degrees along the outer surface thereof so as to be twisted at a predetermined angle, and the space portions 1133 are formed between the blades 1132.

With the configuration of the agitator 113 described above, the exhaust gas passing through the agitator 113 may have a spiral flow to be symmetric with respect to the center of the flow path of the exhaust gas formed by the inner wall 1111 of the preprocessor housing 111 and to be smooth so that harmful substances in the exhaust gas, which are captured by the cleaning liquid sprayed by the first preprocessor sprayer 112 and the second preprocessor sprayer 114, may flow down along the inner wall 1111 of the housing 111.

On the other hand, if the space portions 1133 are not provided between the blades 1132, the exhaust gas introduced through the exhaust gas inlet 1112 may exhibit excessive pressure loss when passing through the agitator 113, which is undesirable in terms of the flow of the exhaust gas.

In addition, the agitator 113 may be preferably fixed and preventing from rotating. This is due to the fact that the exhaust gas introduced through the exhaust gas inlet 1112 generally has a sufficient fluid supply speed toward the preprocessed gas outlet 1113 so that separate propulsion energy is not required for the exhaust gas in the flow path.

The second preprocessor sprayer 114 is disposed between the agitator 113 and the preprocessed gas outlet 1113 in the preprocessor housing 111, and sprays cleaning liquid to the exhaust gas passing through the agitator 113 and flowing spirally through the flow path.

The second preprocessor sprayer 114 further sprays cleaning liquid to the exhaust gas, which passes through the agitator 113 and flows in a curve pattern, preferably in a spiral pattern, toward the preprocessed gas outlet 1113 located in the lower portion of the preprocessor housing 111, so as to facilitate aggregation of the cleaning liquid, which was sprayed by the first preprocessor sprayer 112 and which captured harmful substances, such as PM or the like, contained in the exhaust gas, thereby increasing the size thereof. Thus, the aggregated cleaning liquid flows down along the inner wall 1111 of the preprocessor housing 111 or effectively falls down to the bottom of the preprocessor housing 111.

As described above, the second preprocessor sprayer 114 preferably sprays cleaning liquid having a larger particle diameter than the cleaning liquid sprayed by the first preprocessor sprayer 112 in order to increase the size of the droplets of the cleaning liquid, which was sprayed by the first preprocessor sprayer 112 and captured harmful substances, such as PM or the like, in the exhaust gas. Specifically, the second preprocessor sprayer 114 preferably sprays the cleaning liquid in the form of droplets having a particle diameter of 500 μm to 1,000 μm.

Figure 10:
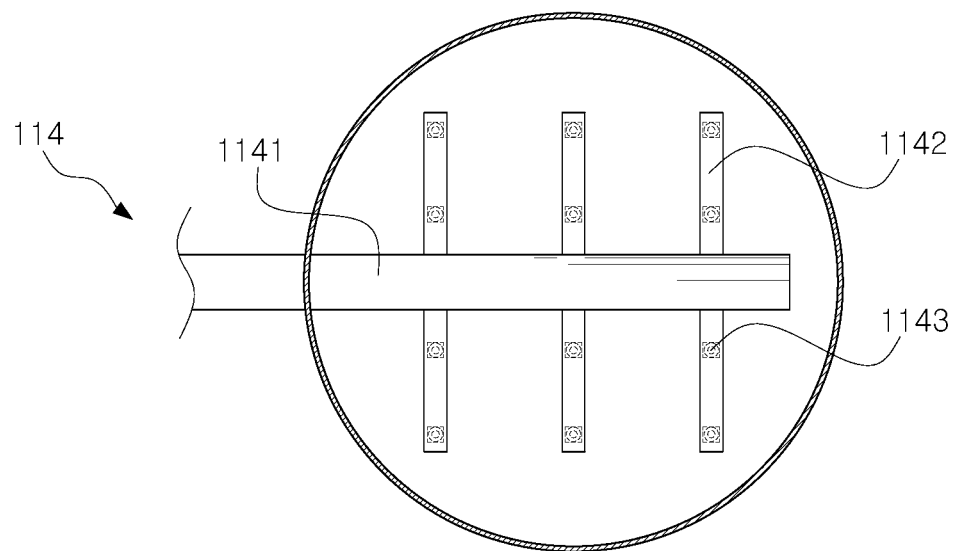
FIG. 10 is a cross-sectional view taken along the line c1-c1' in the section C in FIG. 5.
Figure 11:
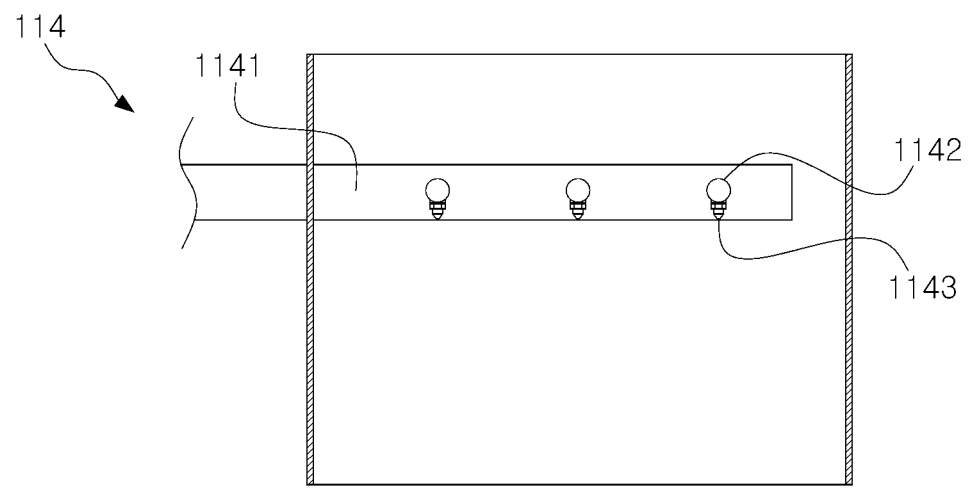
FIG. 11 is a cross-sectional view taken along the line c2-c2' in the section C in FIG. 5.

Referring to FIGS. 10 and 11, in an embodiment of the present disclosure, the second preprocessor sprayer 114 includes a rod-type spray body 1141, a plurality of spray rods 1142 branching side by side from the spray body 1141 at a predetermined interval, and a plurality of spray nozzles 1143 formed at a predetermined interval on the respective spray rods 1142. The spray body 1141 may be supplied with a cleaning liquid and compressed air from the cleaning liquid supply means (not shown) through the cleaning liquid inlet 1114. The spray body 1141 receives the cleaning liquid together with the compressed air and delivers the same to the respective spray rods 1142, and the spray nozzles 1143 spray the cleaning liquid to the exhaust gas.

The second preprocessor sprayer 114 has a structure in which the spray nozzles 1143 for spraying the cleaning liquid are more densely arranged than the first preprocessor sprayer 112, which is advantageous for evenly spraying the cleaning liquid to the exhaust gas passing through the agitator 113 and flowing in a spiral through the flow path without a dead zone.

Like the first preprocessor sprayer 112 described above, the specific shape and arrangement of the second preprocessor sprayer 114 may also vary depending on the spray capacity of the second preprocessor sprayer 114, the overall designed length of the processor 11, and the like.

The connection part 12 moves the preprocessed gas, which is the exhaust gas from which harmful substances are primarily removed, from the preprocessor 11 to the postprocessor 13. Referring to FIGS. 2 to 4, the connection part 12 includes a passage having one end leading to the preprocessed gas outlet 1113 of the preprocessor housing 111 and the opposite end leading to the preprocessed gas inlet 1312 of the postprocessor housing 131.

The postprocessor 13 further removes harmful substances from the preprocessed gas, which is the exhaust gas from which the harmful substances are primarily removed by the preprocessor 11. Referring to FIGS. 1 to 4 and 12, the postprocessor 13 includes a postprocessor housing 131, a diffuser 132, a packing 133, a packing support 134, a first postprocessor sprayer 135, a second postprocessor sprayer 136, a gas/liquid separator 137, a washing means 138, and a droplet blocker 139.

Figure 12:
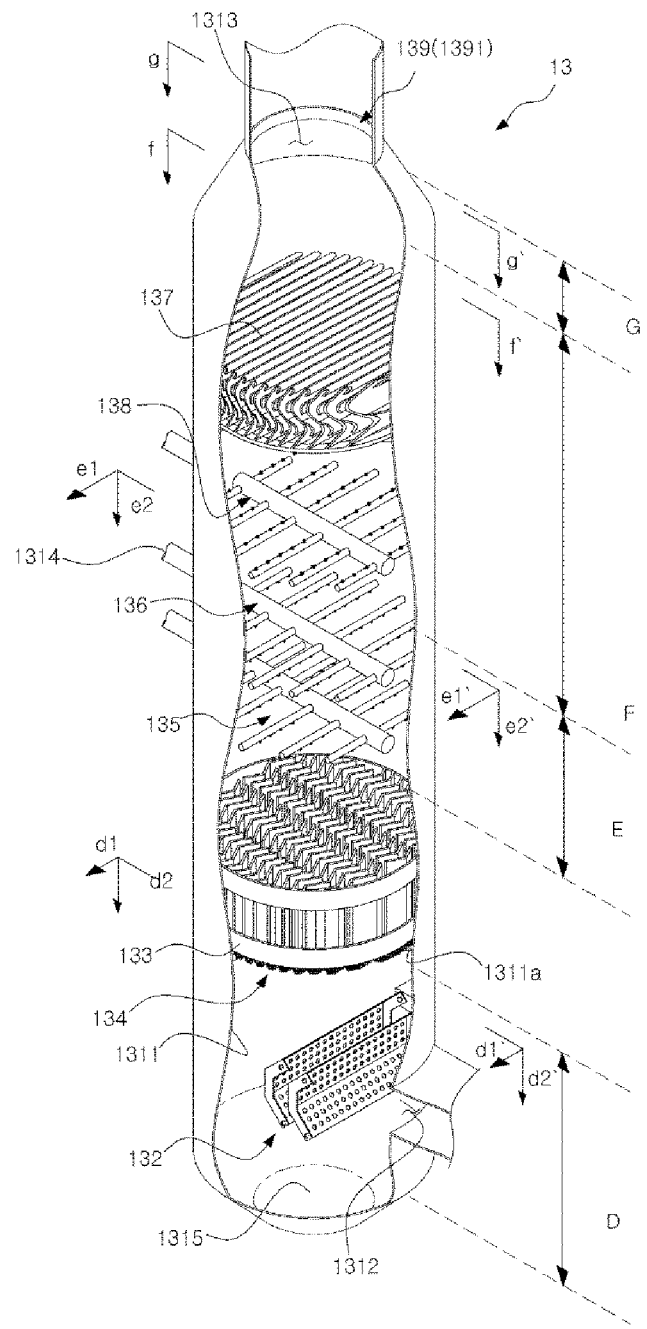
FIG. 12 is a cutaway perspective view of a postprocessor.

The postprocessor housing 131 forms the external shape of the postprocessor 13 and forms a flow path of the preprocessed gas therein. The postprocessor housing 131 includes an inner wall 1311, a preprocessed gas inlet 1312, a postprocessed gas outlet 1313, and a cleaning liquid outlet 1315. As shown in FIGS. 2 and 12, in an embodiment of the present disclosure, the postprocessor housing 131 is formed as a cylindrical tower and provides a flow path for moving the preprocessed gas introduced through one lower side thereof in the upward direction and allowing harmful substances to be further removed from the preprocessed gas.

The inner wall 1311 forms a flow path of the preprocessed gas inside the postprocessor housing 131. Referring to FIGS. 2 and 12, the inner wall 1311 forms a cylindrical flow path of the exhaust gas inside the postprocessor housing 131.

The preprocessed gas flows into the postprocessor housing 131 through the preprocessed gas inlet 1312. As shown in FIGS. 2 to 4 and 12, the preprocessed gas inlet 1312 is formed at one lower side of the postprocessor housing 131, and the preprocessed gas introduced through the preprocessed gas inlet 1312 moves upwards along the cylindrical flow path formed by the inner wall 1311.

The postprocessed gas, which is the preprocessed gas from which harmful substances have been further removed by the postprocessor 13, is discharged through the postprocessed gas outlet 1313. As shown in FIGS. 2 to 4 and 12, the postprocessed gas outlet 1313 is formed at an upper portion of the postprocessor housing 131, and the postprocessed gas obtained by removing harmful substances from the exhaust gas by the preprocessor 11 and the postprocessor 13 may be discharged through the postprocessed gas outlet 1313 into the air.

The cleaning liquid to be sprayed is introduced into the postprocessor 13 through the cleaning liquid inlet 1314. As can be seen in FIGS. 2 and 12, the cleaning liquid inlet 1314 is connected to the first postprocessor sprayer 135, the second postprocessor sprayer 136, and the washing means 138, which will be described later, or is formed therein.

The cleaning liquid, which is sprayed by the first postprocessor sprayer 135 or the second postprocessor sprayer 136 to remove harmful substances from the preprocessed gas introduced into the postprocessor housing 131 through the preprocessed gas inlet 1312, is discharged through the cleaning liquid outlet 1315. As can be seen through FIGS. 2 to 4 and 12, the cleaning liquid outlet 1315 may be formed at the lower end of the postprocessor housing 131, and the cleaning liquid sprayed by the first postprocessor sprayer 135 and the second postprocessor sprayer 136 may capture harmful substances in the preprocessed gas, and may flow to the lower end of the postprocessor housing 131 to then be discharged to the outside through the cleaning liquid outlet 1315. The lower end of the postprocessor housing 131 may be preferably formed in a shape that converges toward the cleaning liquid outlet 1315 in order to facilitate the discharge of the cleaning liquid.

Figure 13:
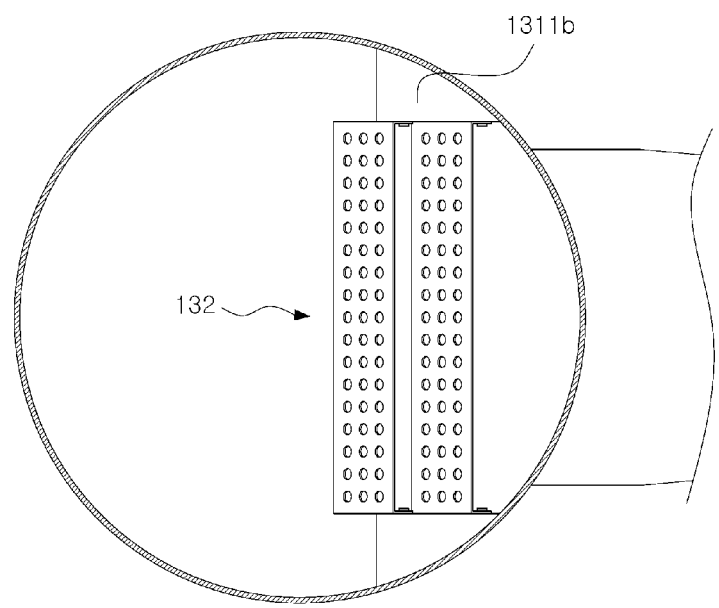
FIG. 13 is a cross-sectional view taken along the line d1-d1' in the section D in FIG. 12.
Figure 14:
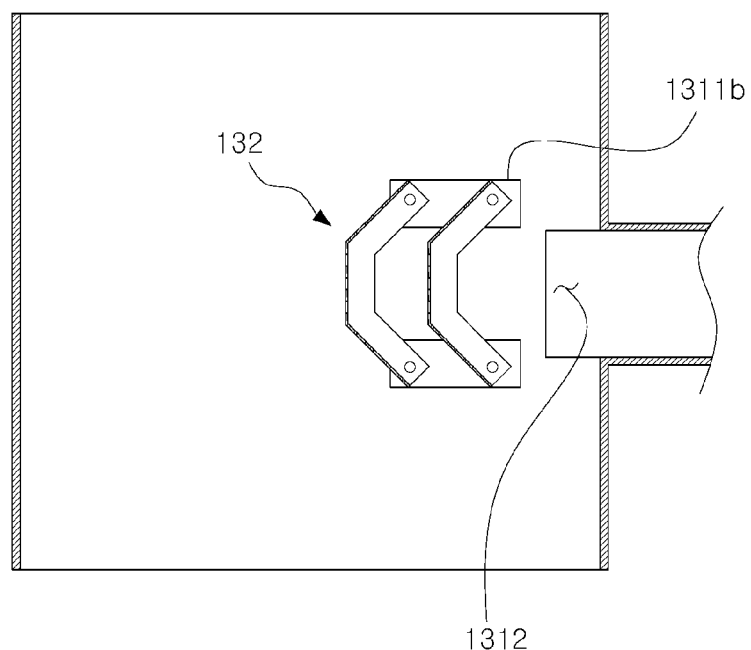
FIG. 14 is a cross-sectional view taken along the line d2-d2' in the section D in FIG. 12.
Figure 15:
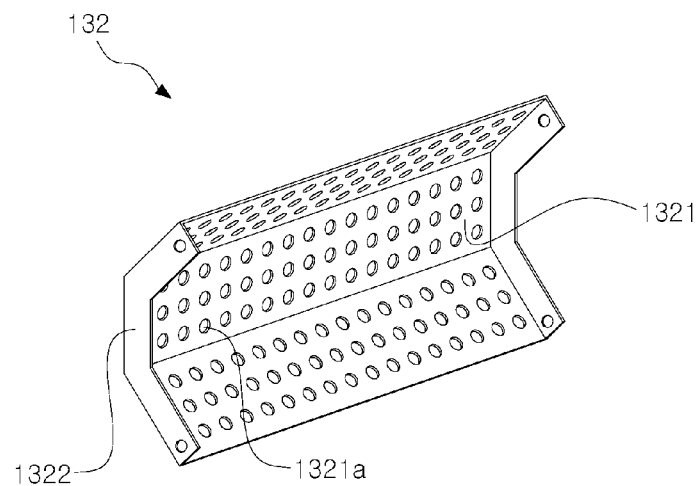
FIG. 15 is a perspective view of a diffuser.

The diffuser 132 is disposed adjacent to the preprocessed gas inlet 1312 in the postprocessor housing 131 in order to diffuse the preprocessed gas introduced through the preprocessed gas inlet 1312. Referring to FIGS. 13 to 15, the diffuser 132 is disposed in front of the preprocessed gas inlet 1312 so as to be spaced apart therefrom and includes a body 1321 and a fastening part 1322.

The body 1321 is a member that is disposed to cover the front of the preprocessed gas inlet 1312 and has a diffusion part 1321a through which the preprocessed gas may pass. The body 1321 may be formed of a plate member. As shown in FIGS. 14 and 15, the body 1321 may be formed in its entirety so as to vertically cover the front of the preprocessed gas inlet 1312, and the upper and lower ends of the body 1321 may be inclined or curved toward the preprocessed gas inlet 1312.

More specifically, the upper end of the body 1321 is inclined upwards toward the preprocessed gas inlet 1312, and the lower end of the body 1321 is inclined downwards toward the preprocessed gas inlet 1312. The body 1321 in the above shape may uniformly diffuse the preprocessed gas introduced through the preprocessed gas inlet 1312 forwards, upwards, and downwards. The overall shape of the body 1321 may be formed to be curved, instead of being formed such that only the upper and lower ends are inclined or curved.

The diffusion part 1321a may include a plurality of through-holes. The diffusion part 1321a may include a plurality of uniformly formed through-holes. However, the diffusion part 1321a is not limited to through-holes, and the diffusion part 1321a may be configured in the form of a slit or the like.

The area or shape of the body 1321, or the size, shape, number, and the like of the diffusion part 1321a may vary depending on the processing capacity of the postprocessor 13.

The fastening part 1322 is fastened to a fixing part 1311b formed inside the postprocessor housing 131, thereby fixing the diffuser 132 to the inside of the postprocessor housing 131. Referring to FIGS. 13 and 14, the fastening part 1322 is vertically extended or bent from the left and right ends of the body 1321 toward the preprocessed gas inlet 1312 and is fastened to the fixing part 1311b formed inside the postprocessor housing 131 using a fastening means, such as a bolt, thereby fixing the diffuser 132 to the inside of the postprocessor housing 131.

Since the preprocessed gas, which is the exhaust gas from which harmful substances are primarily removed by the preprocessor 11, has a spiral flow path that was changed by the agitator 113, the preprocessed gas also has some rotational energy even when the preprocessed gas is discharged through the preprocessed gas outlet 1113 and introduced into the preprocessed gas inlet 1312 via the connection part 12. Therefore, the flow of the preprocessed gas is concentrated on the side of the preprocessed gas inlet 1312 on the inner wall 1311 of the postprocessor housing 131 while entering the postprocessor housing 131, and the preprocessed gas may not be evenly distributed over the flow path of the preprocessed gas formed inside the postprocessor housing 131.

The diffuser 132 may serve as a nozzle to narrow the cross-sectional area of the preprocessed gas when the preprocessed gas flows into the postprocessor housing 131, thereby allowing the preprocessed gas to uniformly diffuse inside the postprocessor housing 131. Accordingly, the preprocessed gas may be evenly distributed over the flow path of the preprocessed gas formed inside the postprocessor housing 131. That is, since the diffuser 132 may evenly disperse the preprocessed gas introduced into the packing 133, it is possible to increase the absorption efficiency of SOx in the preprocessed gas by the packing 133 and to improve the capture efficiency of other harmful substances.

Meanwhile, as shown in FIGS. 13 and 14, two diffusers 132 may be disposed in sequence in front of the preprocessed gas inlet 1312, thereby facilitating uniform diffusion by the diffuser 132.

The packing 133 is intended to increase the contact area between the cleaning liquid sprayed by the first postprocessor sprayer 135 and the second postprocessor sprayer 136, which will be described later, and the preprocessed gas. The packing 133 is disposed above the diffuser 132 in the flow path of the preprocessed gas inside the postprocessor housing 131 and increases the gas/liquid contact area between the preprocessed gas and the cleaning liquid, thereby facilitating the dissolution of SOx, which is a harmful substance in the preprocessed gas, in the cleaning liquid consisting of seawater or fresh water containing alkaline additives.

The packing 133 has a structure including an aggregate of a plurality of fillers, and the filler may be made of steel, ceramic, plastic, or the like. In addition, the packing 133 may be configured as a random packing in which fillers are gathered without a specific pattern or as a structured packing having a specific pattern. The packing 133 may vary in the type and shape thereof depending on the processing capacity and the designed length of the postprocessor 13.

Figure 16:
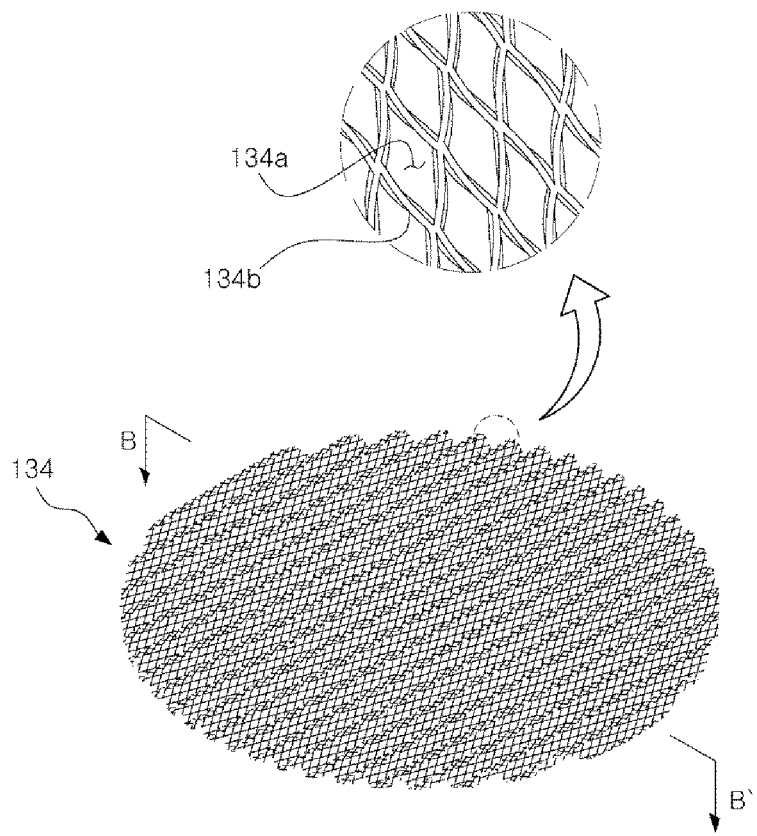
FIG. 16 is a perspective view of a packing support.
Figure 17:
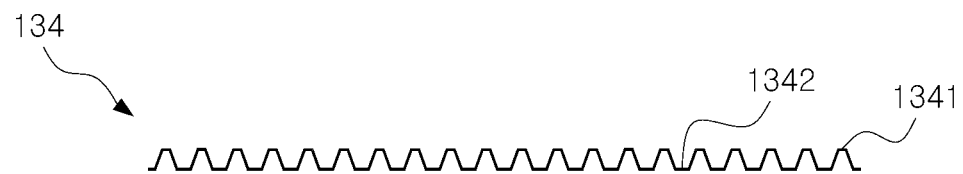
FIG. 17 is a cross-sectional view taken along the line B-B' in FIG. 16.

The packing support 134 supports the packing 133 at the bottom thereof, and diffuses the preprocessed gas. Referring to FIGS. 16 and 17, the packing support 134 covers the flow path of the preprocessed gas, is placed on a protrusion member 1311a, which protrudes inwards from the inner wall 1311 of the postprocessor housing 131, at the edge thereof, and supports the packing 133 placed thereon. In the present disclosure, the packing support 134 has a function of diffusing the preprocessed gas at the lower portion of the packing 133.

The packing support 134 includes an opening part 134a formed to allow the preprocessed gas to pass therethrough and a support part 134b supporting the packing. More specifically, the support part 134b is a strand having a cross structure, and the opening part 134a is a through-hole formed by the support part 134b. That is, the packing support 134 has an opening part 134a in the form of a mesh formed by the support part 134b having the cross structure. This mesh structure may lower the resistance, thereby reducing the pressure loss of the preprocessed gas.

It is preferable to increases the passage area of the preprocessed gas by increasing the ratio of the opening part 134a (i.e., the ratio of the through-holes in the mesh structure) of the packing support 134, compared to a general mesh structure, thereby minimizing the pressure loss of the preprocessed gas. More specifically, it is preferable to configure the ratio of the area of the opening part 134a to the vertical projection area of the support part 134b to range approximately from 2:1 to 4:1.

Meanwhile, as shown in FIG. 16, at least a portion of the support part 134b preferably has a twisted structure. If the support part 134b has a twisted structure as described above, the preprocessed gas that collides with the support part 134b, among the preprocessed gas passing through the opening part 134a, is changed in its traveling direction along the twisted direction. As a result, the preprocessed gas may be diffused more widely, and more uniform and active dispersion and diffusion of the preprocessed gas may be realized.

In the present disclosure, the packing support 134 plays the role of evenly distributing the preprocessed gas introduced into the packing 133 over the entire lower area of the packing 133, as well as supporting the packing 133. As a result, it is possible to increase the absorption efficiency of SOx of the preprocessed gas in the packing 133 through the packing support 134, and to improve the efficiency of capture of other harmful substances.

Meanwhile, the packing support 134 preferably has a corrugated structure in which peaks 1341 and valleys 1342 are alternately connected side by side. The above corrugated structure may improve the support force per unit area so that the packing 133 can be more stably supported by the peaks 1341. Furthermore, this structure allows the pressure of the preprocessed gas flowing toward the packing 133 to be uniformly distributed over the packing support 134, so that the preprocessed gas flowing to the packing 133 under the packing 133 may diffuse uniformly to the bottom of the packing 133.

The first postprocessor sprayer 135 is disposed in the flow path of the preprocessed gas inside the postprocessor housing 131 and sprays cleaning liquid to the preprocessed gas. The first postprocessor sprayer 135 is disposed above the packing 133 and sprays the cleaning liquid to the packing 133.

Figure 18:
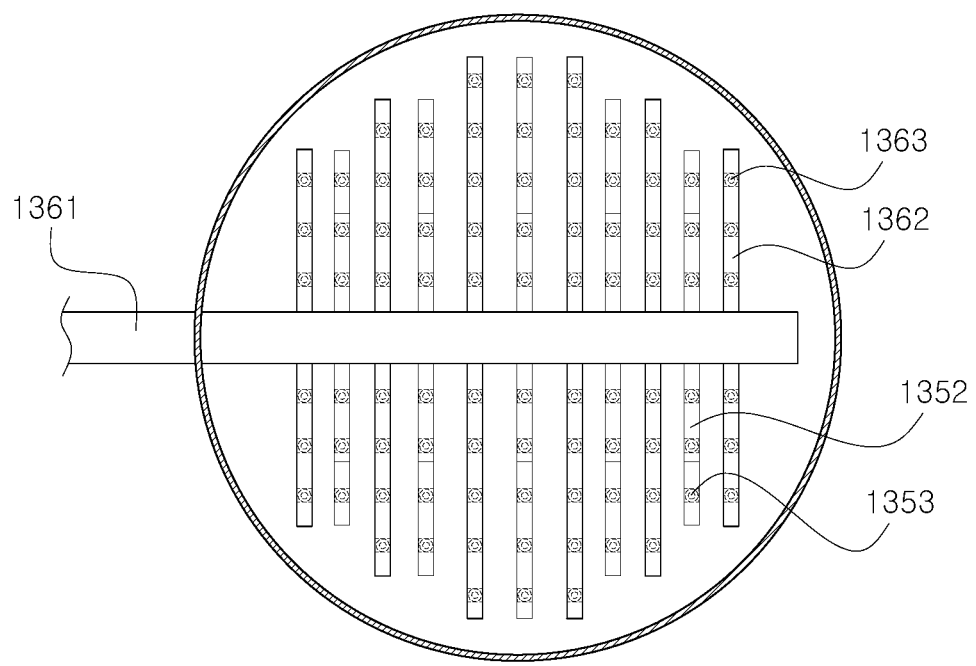
FIG. 18 is a cross-sectional view taken along the line e1-e1' in the section E in FIG. 12.
Figure 19:
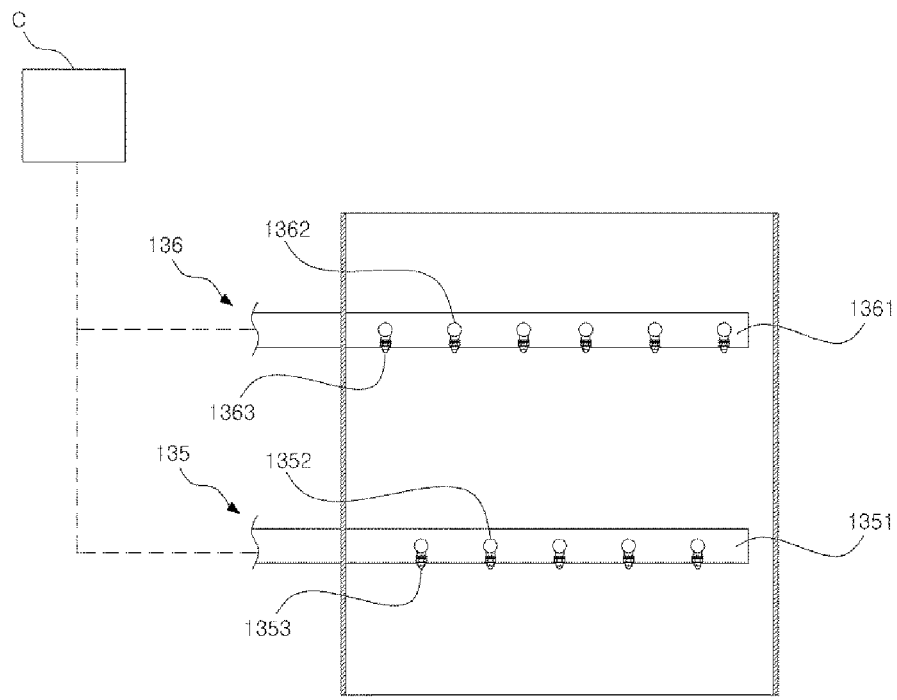
FIG. 19 is a cross-sectional view taken along the line e2-e2' in the section E in FIG. 12.

Referring to FIGS. 12, 18, and 19, in an embodiment of the present disclosure, the first postprocessor sprayer 135 may include a rod-type spray body 1351, a plurality of spray rods 1352 branching side by side from the spray body 1351 at a predetermined interval, and a plurality of spray nozzles 1353 formed on the respective spray rods 1352 at a predetermined interval, and may further include a cleaning liquid supply means (not shown) for supplying cleaning liquid and compressed air to the respective spray rods 1352 through the spray body 1351. The cleaning liquid and compressed air are supplied from the cleaning liquid supply means (not shown) to the spray body 1351 through the cleaning liquid inlet 1314. The spray body 1351 receives the cleaning liquid together with the compressed air and delivers the same to the respective spray rods 1352, and the spray nozzles 1353 spray the cleaning liquid to the exhaust gas.

The specific shape and arrangement of the first postprocessor sprayer 135 may vary depending on the spray capacity of the first postprocessor sprayer 135, the overall designed length of the postprocessor 13, and the like.

The second postprocessor sprayer 136 is disposed in the flow path of the preprocessed gas inside the postprocessor housing 131 so as to spray cleaning liquid to the preprocessed gas, but the second postprocessor sprayer 136 operates independently from the first postprocessor sprayer 135. Independent operation of the second postprocessor sprayer 136 may be performed under the control of the controller (C) as shown in FIG. 19. The controller (C) performs control such that the spray of cleaning liquid by the first postprocessor sprayer 135 is performed independently from that of the second postprocessor sprayer 136.

Referring to FIGS. 12, 18, and 19, in an embodiment of the present disclosure, the second postprocessor sprayer 136 may include a rod-type spray body 1361, a plurality of spray rods 1362 branching side by side from the spray body 1361 at a predetermined interval, and a plurality of spray nozzles 1363 formed on the respective spray rods 1362 at a predetermined interval, and may further include a cleaning liquid supply means (not shown) for supplying cleaning liquid and compressed air to the respective spray rods 1362 through the spray body 1361. The cleaning liquid and compressed air are supplied from the cleaning liquid supply means (not shown) to the spray body 1361 through the cleaning liquid inlet 1314. The spray body 1361 receives the cleaning liquid together with the compressed air and delivers the same to the respective spray rods 1362, and the spray nozzles 1363 spray the cleaning liquid to the exhaust gas.

Like the description of the first postprocessor sprayer 135 above, the specific shape and arrangement of the second postprocessor sprayer 136 may vary depending on the spray capacity of the second postprocessor sprayer 136, the overall designed length of the postprocessor 13, and the like.

Operation of the second postprocessor sprayer 136 independent from that of the first postprocessor sprayer 135 means that the second postprocessor sprayer 136 may spray the cleaning liquid selectively or at the same time as the first postprocessor sprayer 135. Therefore, if the amount of the exhaust gas generated by combustion and the amount of the preprocessed gas introduced from the preprocessor 11 change according to the load of the engine, it is possible to appropriately spray the cleaning liquid according thereto, thereby ensuring economical operation of the postprocessor 13.

The second postprocessor sprayer 136 is disposed above the first postprocessor sprayer 135 at a predetermined interval. If the second postprocessor sprayer 136 and the first postprocessor sprayer 135 are disposed in the same horizontal plane in the flow path of the preprocessed gas, resistance to the flow of the preprocessed gas is increased. Therefore, it is preferable to arrange the second postprocessor sprayer 136 and the first postprocessor sprayer 135 at different heights.

Furthermore, it is more preferable to arrange the first postprocessor sprayer 135 and the second postprocessor sprayer 136 so as to cross each other in the flow path of the preprocessed gas when viewed from above while being disposed at different heights. This arrangement causes the cleaning liquid to be evenly sprayed to the preprocessed gas in the flow path thereof without a dead zone and enables more effective removal of harmful substances from the preprocessed gas.

Hereinafter, a mechanism for removing harmful substances from the preprocessed gas using the cleaning liquid sprayed by the first postprocessor sprayer 135 and the second postprocessor sprayer 136 will be described.

The preprocessed gas contains harmful substances, such as sulfur oxides (SOx), PM, and the like, which are acidic substances, and the first postprocessor sprayer 135 and the second postprocessor sprayer 136 spray cleaning liquid in order to neutralize or aggregate the harmful substances to then remove the same. In general, PM 0.1 to 0.5 μm in size is first aggregated by microdroplets (100 to 200 μm) so that the size thereof is increased. In addition, in order to neutralize the acidic sulfur oxides (SOx), an alkaline cleaning liquid is required. In the case where fresh water is used, separate alkaline additives are added to induce a neutralization reaction.

In this case, the alkaline additives may be NaOH (sodium hydroxide), Na2CO3 (sodium carbonate), $Na_2CO_3$ (sodium bicarbonate), and the like. The neutralization reaction of sulfur oxides (SOx) by the cleaning liquid having NaOH added thereto is as follows.

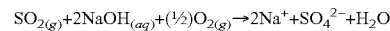

$$SO_{2(g)} + 2NaOH_{(aq)} + (\tfrac{1}{2})O_{2(g)} \rightarrow 2Na^+ + SO_4^{2-} + H_2O$$

However, as described above, in the case where the present disclosure is applied to a ship, seawater, which is brine, may be used as cleaning liquid. In general, seawater contains salts, such as sodium chloride (NaCl), magnesium chloride ($MgCl_2$), potassium chloride (KCl), and the like, and exhibits slight alkalinity of pH 7.8 to 8.3 due to anions $Cl^-$, $SO_4^{2-}$, $Br^-$, and the like, which are produced by the solution of salts. Therefore, if such seawater is used as cleaning liquid, it is possible to neutralize sulfur oxides (SOx) without adding separate alkaline additives.

In this case, the neutralization reaction using seawater is as follows. First, sulfur dioxide ($SO_2$) in a gaseous state is mixed with water.

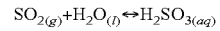

$$SO_{2(g)} + H_2O_{(l)} \leftrightarrow H_2SO_{3(aq)}$$

Next, it reacts with a base in seawater.

$$2H_2SO_{3(aq)} + OH^- \leftrightarrow 2HSO_3^-{}_{(aq)} + H^+{}_{(aq)} + H_2O_{(aq)}$$

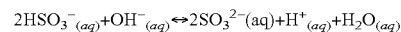

$$2HSO_3^-{}_{(aq)} + OH^-{}_{(aq)} \leftrightarrow 2SO_3^{2-}(aq) + H^+{}_{(aq)} + H_2O_{(aq)}$$

In other words, sulfur dioxide is absorbed into the seawater to form sulfates.

The gas/liquid separator 137 is disposed above the second postprocessor sprayer 136 inside the postprocessor housing 131 to separate microdroplets passing through the second postprocessor sprayer 136 and flowing along the flow path of the preprocessed gas. The gas/liquid separator 137 is disposed in such a manner that the edge thereof is placed on a protrusion member 1311a protruding inwards from the inner wall 1311 of the postprocessor housing 131.

The gas/liquid separator 137 separates, filters, and collects aerosol-type droplets or mist generated by contact between the preprocessed gas and the cleaning liquid. The gas/liquid separator 137 may include a plurality of blades arranged at a predetermined interval and each having a vertical cross section in a zigzag shape. In addition, the specific form of the gas/liquid separator 137 may vary depending on the design of the postprocessor 13, the temperature, chemical characteristics, and the like.

The washing means 138 is disposed above the second postprocessor sprayer 136 and below the gas/liquid separator 137 inside the postprocessor housing 131 so as to spray cleaning liquid toward the gas/liquid separator 137.

Figure 20:
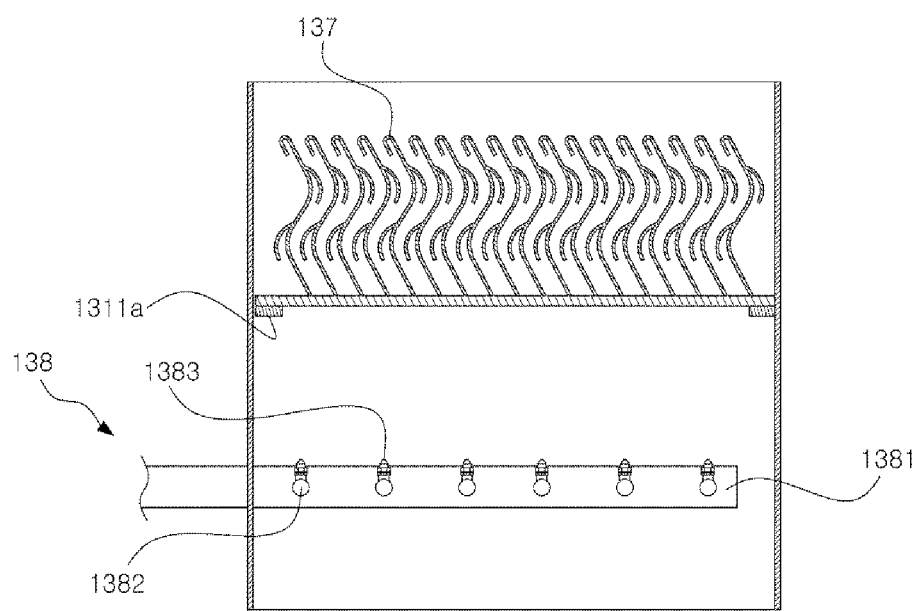
FIG. 20 is a cross-sectional view taken along the line f-f' in the section F in FIG. 12.
Figure 21:
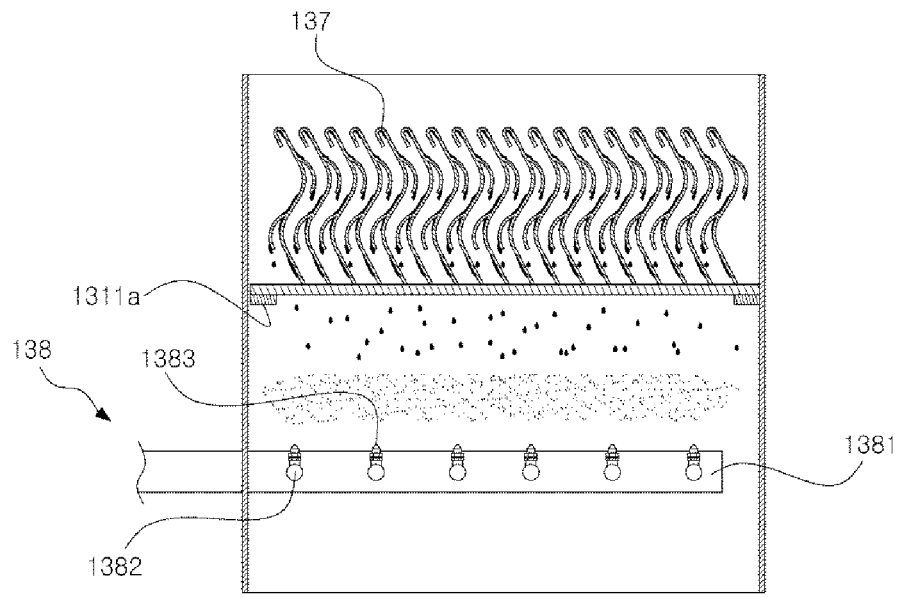
FIG. 21 is a reference diagram illustrating the washing process in FIG. 20.

Referring to FIGS. 12, 20 and 21, in an embodiment of the present disclosure, the washing means 138 may include a rod-type spray body 1381, a plurality of spray rods 1382 branching side by side from the spray body 1381 at a predetermined interval, and a plurality of spray nozzles 1383 formed at a predetermined interval on the respective spray rods 1382, and may further include a cleaning liquid supply means (not shown) for supplying cleaning liquid and compressed air to the respective spray rods 1382 through the spray body 1381. The cleaning liquid and the compressed air are supplied from the cleaning liquid supply means (not shown) to the spray body 1381 through the cleaning liquid inlet 1314. The spray body 1381 receives the cleaning liquid together with the compressed air and delivers the same to the respective spray rods 1382, and the spray nozzles 1383 spray the cleaning liquid toward the gas/liquid separator 137.

The gas/liquid separator 137 may become contaminated or clogged in the process of separating, filtering, and collecting microdroplets or mist in the state of capturing harmful substances, such as PM and the like, in the preprocessed gas. The washing means 138 washes the gas/liquid separator 137 using cleaning liquid, thereby preventing contamination and blockage of the gas/liquid separator 137.

In addition, the washing means 138 increases the size of the microdroplets or mist separated by the gas/liquid separator 137 by spraying the cleaning liquid so that the microdroplets or mist, having a larger size and having captured the harmful substances, may efficiently fall to the bottom of the postprocessor housing 131 or may flow down along the inner wall 1311 of the postprocessor housing 131.

Figure 22:
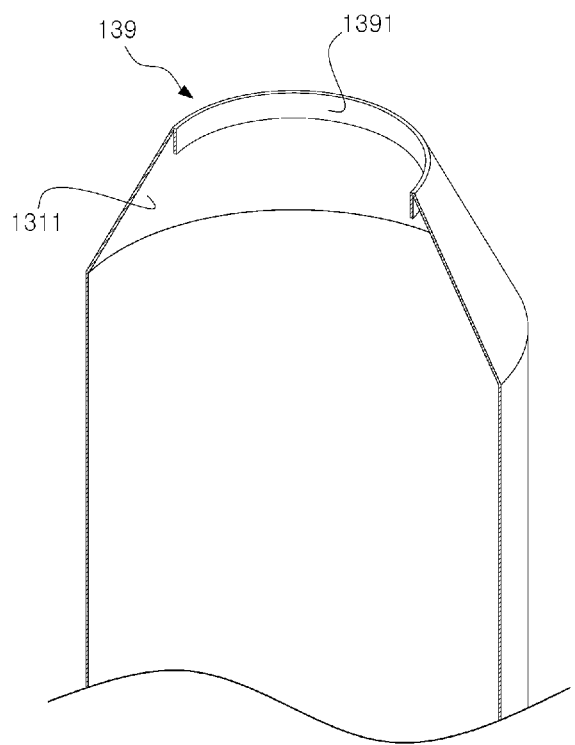
FIG. 22 is a cutaway perspective view taken along the line g-g' in the section G in FIG. 12.
Figure 23:
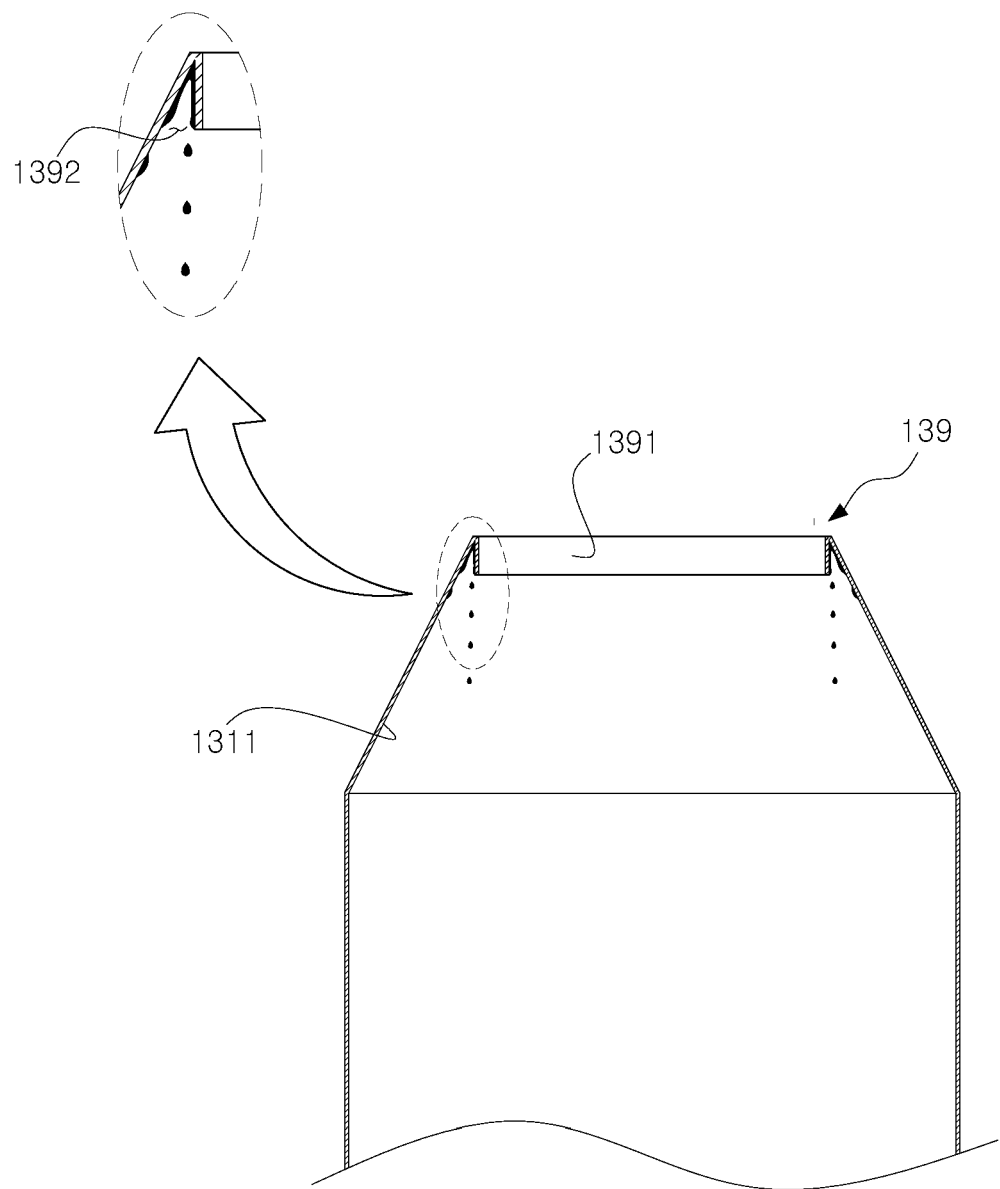
FIG. 23 is a reference diagram illustrating the droplet blocking process in FIG. 22.

The droplet blocker 139 blocks droplets rising along the inner wall 1311 of the postprocessor housing 131 and flowing out through the postprocessed gas outlet 1313. Referring to FIGS. 12, 22, and 23, the drop blocker 139 includes a blocking wall 1391. In addition, the droplet blocker 139 has a capturing space 1392 for capturing the droplets in the vicinity of the postprocessed gas outlet 1313 to prevent the outflow of the droplets. The capturing space 1392 is shaped so as to allow the captured droplets to drop to the bottom.

The postprocessed gas outlet 1313 is formed in an upward direction at the top of the postprocessor housing 131, and the droplet blocker 139 includes the blocking wall 1391 extending down from the edge of the postprocessed gas outlet 1313. A capturing space 1392 is formed between the blocking wall 1391 and the inner wall of the upper portion of the postprocessor housing 131. The inner wall 1311 of the upper portion of the postprocessor housing 131 is inclined to converge toward the postprocessed gas outlet, and the blocking wall 1391 extends downwards in the vertical direction in order to effectively form the capturing space 1392 and efficiently block the outflow of the droplets.

Harmful substances are further removed from the preprocessed gas while the preprocessed gas rises along the flow path thereof formed inside the postprocessor 13, and the postprocessed gas obtained as a result of the removal of the harmful substances is discharged through the postprocessed gas outlet 1313. During the process, some of the droplets consisting of the cleaning liquid capturing the harmful substances in the preprocessed gas rise along the inner wall 1311 of the postprocessor housing 131 and move toward the postprocessed gas outlet 1313.

The droplets reaching the vicinity of the edge of the postprocessed gas outlet 1313 along the upper inner wall 1311 of the postprocessor housing 131 are caught by the blocking wall 1391. In addition, since the capturing space 1392 is formed between the blocking wall 1391 and the inner wall 1311 of the postprocessor housing 131 around the postprocessed gas outlet 1313 for aggregating the droplets, the droplets aggregate in the capturing space 1392 to increase the size and weight thereof, thereby falling to the bottom of the postprocessor housing 131.

As described above, the droplet blocker 139 blocks droplets, having captured harmful substances in the preprocessed gas, from being discharged to the outside through the postprocessed gas outlet 1313 and facilitates separation of the droplets and falling thereof to the bottom of the postprocessor housing 131.

Although the applicant has described various embodiments of the present disclosure above, these embodiments are merely examples for implementing the technical concept of the present disclosure, and any changes or modifications thereof should be construed as falling within the scope of the present disclosure as long as the technical concept of the present disclosure is implemented.

What is claimed is:
1. An exhaust gas treatment apparatus comprising:
a preprocessor configured to primarily remove harmful substances from exhaust gas produced by combustion; and
a postprocessor configured to further remove harmful substances from preprocessed gas, which is the exhaust gas from which the harmful substances have been primarily removed by the preprocessor,
the postprocessor comprising:
a postprocessor housing having a preprocessed gas inlet through which the preprocessed gas is introduced and a postprocessed gas outlet through which postprocessed gas from which harmful substances have been further removed by the postprocessor is discharged and forming a flow path of the preprocessed gas therein; and
a diffuser disposed adjacent to the preprocessed gas inlet so as to be spaced apart from the preprocessed gas inlet and configured to diffuse the preprocessed gas introduced through the preprocessed gas inlet;
wherein the diffuser comprises a body formed so as to vertically cover a front portion of the preprocessed gas inlet, the body having a plurality of through-holes, wherein an upper end of the body and a lower end of the body are inclined or curved from a central portion of the body towards the preprocessed gas inlet.

2. The exhaust gas treatment apparatus of claim 1, wherein the body of the diffuser forms an overall curved shape.

3. The exhaust gas treatment apparatus of claim 2, wherein two or more diffusers are arranged in sequence in front of the preprocessed gas inlet.

4. The exhaust gas treatment apparatus of claim 1, wherein the preprocessor comprises:
 a preprocessor housing having an exhaust gas inlet through which the exhaust gas is introduced and a preprocessed gas outlet through which the preprocessed gas, which is the exhaust gas from which the harmful substances have been primarily removed by the preprocessor, is discharged and forming a flow path of the exhaust gas therein; and
 an agitator configured to cause the exhaust gas in the flow path to flow in a curved pattern.

5. The exhaust gas treatment apparatus of claim 4, wherein the agitator is arranged to cover the flow path inside the preprocessor housing and comprises a body in a center thereof and blades radially coupled to the body at a predetermined torsion angle.

6. The exhaust gas treatment apparatus of claim 5, wherein the agitator has space portions formed between the blades and through which the exhaust gas passes without colliding with the blades.

7. The exhaust gas treatment apparatus of claim 6, wherein the agitator is fixed and preventing from rotating.

8. The exhaust gas treatment apparatus of claim 4, wherein the preprocessor further comprises:
 a first preprocessor sprayer disposed between the exhaust gas inlet and the agitator and configured to spray cleaning liquid to the exhaust gas introduced through the exhaust gas inlet; and
 a second preprocessor sprayer disposed between the agitator and the preprocessed gas outlet and configured to spray cleaning liquid to the exhaust gas that flows in a spiral pattern by passing through the agitator in the flow path.

9. The exhaust gas treatment apparatus of claim 8, wherein the first preprocessor sprayer sprays the cleaning liquid in the form of microdroplets, compared to the second preprocessor sprayer.

10. The exhaust gas treatment apparatus of claim 9, wherein the first preprocessor sprayer sprays the cleaning liquid in the form of droplets having a particle diameter of 100 to 200 μm.

11. The exhaust gas treatment apparatus of claim 10, wherein the second preprocessor sprayer sprays the cleaning liquid in the form of droplets having a particle diameter of 500 to 1,000 μm.

12. The exhaust gas treatment apparatus of claim 8, wherein the exhaust gas treatment apparatus comprising the diffuser is installed in a ship, and
 wherein the harmful substances comprise sulfur oxides (SOx).

13. The exhaust gas treatment apparatus of claim 1, wherein a first gas flow direction defined by the preprocessed gas inlet is perpendicular to a second gas flow direction defined by the postprocessed gas outlet.

14. The exhaust gas treatment apparatus of claim 1, wherein a longitudinal axis of the postprocessor is perpendicular to a longitudinal axis of the preprocessed gas inlet.

15. An exhaust gas treatment apparatus comprising:
 a preprocessor configured to primarily remove harmful substances from exhaust gas produced by combustion,
 the preprocessor comprising:
  a preprocessor housing having an exhaust gas inlet through which the exhaust gas is introduced and a preprocessed gas outlet through which preprocessed gas, which is the exhaust gas from which the harmful substances have been primarily removed by the preprocessor, is discharged and forming a flow path of the exhaust gas therein,
  an agitator configured to cause the exhaust gas in the flow path to flow in a curved pattern,
  a first preprocessor sprayer disposed between the exhaust gas inlet and the agitator and configured to spray cleaning liquid to the exhaust gas introduced through the exhaust gas inlet, and
  a second preprocessor sprayer disposed between the agitator and the preprocessed gas outlet and configured to spray cleaning liquid to the exhaust gas that flows in a spiral pattern by passing through the agitator in the flow path; and
 a postprocessor configured to further remove harmful substances from preprocessed gas, which is the exhaust gas from which the harmful substances have been primarily removed by the preprocessor,
 the postprocessor comprising:
  a postprocessor housing having a preprocessed gas inlet through which the preprocessed gas is introduced and a postprocessed gas outlet through which postprocessed gas from which harmful substances have been further removed by the postprocessor is discharged and forming a flow path of the preprocessed gas therein; and
  a diffuser disposed adjacent to the preprocessed gas inlet and configured to diffuse the preprocessed gas introduced through the preprocessed gas inlet.

\* \* \* \* \*